US006769507B2

(12) United States Patent
Murakami et al.

(10) Patent No.: US 6,769,507 B2
(45) Date of Patent: Aug. 3, 2004

(54) ELECTRIC POWER STEERING APPARATUS

(75) Inventors: Tetsuya Murakami, Nara (JP); Takeo Iino, Kashiwara (JP); Masanori Kobayashi, Nara (JP); Akihiko Shiina, Kashihara (JP); Yoshio Ito, Tondabayashi (JP); Tatsuo Otsuka, Tondabayashi (JP); Takayuki Todaka, Fujisawa (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/379,191

(22) Filed: Mar. 4, 2003

(65) Prior Publication Data

US 2003/0127277 A1 Jul. 10, 2003

Related U.S. Application Data

(62) Division of application No. 09/854,164, filed on May 10, 2001, now Pat. No. 6,550,567.

(30) Foreign Application Priority Data

| May 10, 2000 | (JP) | 2000-137717 |
| Jul. 19, 2000 | (JP) | 2000-219371 |
| Nov. 15, 2000 | (JP) | 2000-348220 |

(51) Int. Cl.$^7$ ............................................. B62D 5/04
(52) U.S. Cl. ...................................... 180/444; 180/428
(58) Field of Search ................................. 180/443, 446, 180/444, 427, 428; 74/390, 388 PS

(56) References Cited

U.S. PATENT DOCUMENTS

| 3,641,832 A | * | 2/1972 | Shigeta et al. ............... 74/427 |
| 3,781,073 A | * | 12/1973 | Jorn et al. ................... 384/291 |
| 3,885,840 A | * | 5/1975 | Neder ......................... 384/536 |
| 5,040,631 A | * | 8/1991 | Lang et al. .................. 180/446 |
| 5,669,718 A | * | 9/1997 | Sakairi et al. ............... 384/220 |
| 5,675,456 A | * | 10/1997 | Myers ...................... 360/265.6 |
| 5,834,662 A | * | 11/1998 | Stoll et al. .................... 74/425 |
| 6,044,723 A | * | 4/2000 | Eda et al. ............... 74/388 PS |
| 6,439,337 B1 | * | 8/2002 | Ballester ..................... 180/427 |

FOREIGN PATENT DOCUMENTS

JP    2001-163229    *  6/2001    ............ B62D/5/04

* cited by examiner

Primary Examiner—Avraham Lerner
(74) Attorney, Agent, or Firm—Darby & Darby

(57) ABSTRACT

On the outer periphery of a bearing 10 for supporting a worm 71 rotating interlocked with the rotation of a steering assist motor 6 inside the housing 8, elastic members 20 are provided to restrain the bearing 10 from moving in the radial direction thereof. The force for the restraint by the elastic members 20 is made different depending on the position in the peripheral direction thereof. A portion of the elastic member, wherein the force for restraining the movement of the bearing 10 in the radial direction is small, energizes the worm 71 to the meshing position of the worm 71 and a worm wheel 72. Another portion, wherein the force for restraining the movement is large, restrains the worm 71 from moving along the lead of the worm wheel 72. With this configuration, the elastic members 20 can reduce the amount of the backlash at the meshing portion of the worm 71 and the worm wheel 72, and can make the rotation torque applied to the meshing portion of the worm gears relatively small.

16 Claims, 19 Drawing Sheets

US 6,769,507 B2

ELECTRIC POWER STEERING APPARATUS

This is a division, of application Ser. No. 09/854,164, filed May 10, 2001 now U.S. Pat. No. 6,550,567. Each of these prior applications is hereby incorporated herein by reference, in its entirety.

BACKGROUND OF THE INVENTION

The present invention relates to an electric power steering apparatus using an electric motor as a source for generating a steering assist force.

Controlling the steering of a vehicle is carried out by transmitting the rotation operation of the steering wheel disposed inside a vehicle interior to a steering mechanism disposed outside the vehicle interior in order to steer the steering control wheels to be steered (generally the front wheels of the vehicle).

FIG. 1 is a sectional view showing a conventional electric power steering apparatus, and FIG. 2 is a sectional view showing the reduction mechanism portion thereof As shown in FIG. 1, the conventional electric power steering apparatus of a vehicle for example comprises a first steering shaft 101 connected to a steering wheel 100, a second steering shaft 103 whose upper end portion is coaxially connected to the lower end portion of the first steering shaft 101 via a torsion bar 102 and whose lower end portion is connected to a steering mechanism linked to wheels, a torque sensor 104 for detecting torque applied to the first steering shaft 101 depending on torsion generated in the torsion bar 102 by the rotation of the steering wheel 100, a steering assist motor 105 driven on the basis of the detection result by the torque sensor 104, and a reduction mechanism having a worm 106 and a worm wheel 107 and connected to the output shaft of the motor 105 to reduce the rotation speed of the output shaft and to transmit the rotation to the second steering shaft 103. In this electric power steering apparatus having the above-mentioned configuration, the operation of the steering mechanism depending on the rotation of the steering wheel 100 is assisted by the rotation of the motor 105, whereby the steering effort of the driver can be reduced.

As shown in FIG. 2, the worm 106 constituting the reduction mechanism is supported in the fitting holes of a housing 110 via a pair of rolling bearings 108a and 108b. The second steering shaft 103 provided with the worm wheel 107 is supported in the fitting holes of the housing 110 via a pair of rolling bearings 109a and 109b as shown in FIG. 1, and is prevented from moving in the radial and axial directions thereof.

In the case when such reduction mechanism is used, the worm 106, the worm wheel 107, the rolling bearings 108a, 108b, 109a and 109b, the second steering shaft 103 and the housing 110, machined so that the distance between the rotation centers of the worm 106 and the worm wheel 107 coincides with the distance between the centers of the fitting holes for the rolling bearings 108a and 108b and the centers of the fitting holes for the rolling bearings 109a and 109b within an allowable range, are assembled selectively in order to reduce the amount of the backlash at the meshing portion of the worm 106 and the worm wheel 107. However, this assembly work takes a long time. In addition, the amount of the backlash increases when the amount of the wear at the teeth of the worm 106 and the worm wheel 107 increases. Countermeasures for these problems have been demanded.

In addition, another electric power steering apparatus is known. This apparatus is configured to reduce the amount of the backlash at the meshing portion of the worm 106 and the worm wheel 107 by providing rubber rings between the outer peripheral surfaces of the bearings 108a and 108b for supporting the worm 106 connected to the output shaft of the motor 105 and the fitting holes of the housing 110, and by energizing the worm 106 toward the worm wheel 107 (hereafter referred to as a first radial direction Y) by virtue of the elastic restoring forces of the rubber rings. One of the pair of fitting holes into which the bearings 108a and 108b are fitted is made eccentric with respect to the other.

However, the tooth lead of the worm wheel 107 of the reduction mechanism is inclined in its rotation direction with respect to its rotation center line. For this reason, when rotation torque is applied from the worm 106 to the worm wheel 107, that is, when steering is assisted by the rotation of the motor 105, the worm 106 is pressed relatively strongly so as to be moved in its radial direction (hereafter referred to as a second radial direction X) along the tooth lead of the worm wheel 107. In the case of the conventional electric power steering apparatus configured to reduce the amount of the backlash by using the rubber rings as described above, the elastic restoring force (spring constant) of the rubber ring is constant along the entire circumference thereof. This causes problems described below.

When the elastic restoring force of the rubber ring is relatively small, the rotation torque applied to the meshing portion of the worm 106 and the worm wheel 107 (the torque applied to the steering shaft) can be made relatively small. However, the amount of the movement of the worm 106 in the second radial direction X becomes relatively large, and the worm 106 is in danger of being damaged.

In addition, when the elastic restoring force of the rubber ring is relatively large, the amount of the movement of the worm 106 in the second radial direction X can be made very small. However, the rotation torque applied to the meshing portion of the worm 106 and the worm wheel 107 becomes relatively large, and the rotation performance of the worm 106 becomes worse. This worsens the return of the steering wheel and also worsens the feeling of the steering wheel when steering is neutral.

Furthermore, as shown in FIG. 2, both end portions of the worm 106 constituting the reduction mechanism are supported in the fitting holes of the housing 110 via the pair of rolling bearings 108a and 108b. A screw ring 111 screwed into a screw hole formed so as to be connected to the fitting hole of the housing 110 is made contact with the outer ring of one of the rolling bearings, that is, 108a. By rotating the screw ring 111, the outer ring and the inner ring of the rolling bearing 108a are moved relatively in its axial direction, thereby eliminating thrust gaps at the pair of rolling bearings 108a and 108b, and preventing the worm 106 from rattling in its axial direction. Moreover, the second steering shaft 103, on which the worm wheel 107 is provided, is supported in the fitting holes of the housing 110 via the pair of rolling bearings 109a and 109b, thereby being prevented from moving in its radial and axial directions.

However, when preventing the worm 106 from rattling in its axial direction by using the screw ring 111, it is necessary to use error absorption means for absorbing an adjustment error owing to the rotation operation of the screw ring 111 on the side of the screw ring 111 in order to securely eliminate the thrust gaps at the pair of rolling bearings 108a and 108b. Besides, since the outer ring of the rolling bearing 108a is directly pressed by the rotation operation of the screw ring 111, the rolling bearing 108a is in danger of being preliminary pressurized more than necessary owing to a slight rotation error of the screw ring 111. In this case, the rotation torque of the worm 106 increases, thereby increasing the frictional resistance of the entire steering assist mechanism. This worsens the return of the steering wheel and also worsens the feeling of the steering wheel when steering is neutral. Countermeasures for this problem have been demanded.

In addition, as means for reducing the amount of the backlash at the meshing portion of the worm 106 and the worm wheel 107, a configuration is designed, set and manufactured so that a minus gap, i.e., a minus tolerance, is generated in the radial direction at the meshing portion of the worm 106 and the worm wheel 107 by making the distance between the centers of the fitting holes for the rolling bearings 108a and 108b and the centers of the fitting holes for the rolling bearings 109a and 109b of the housing 110 smaller than the distance between the rotation centers of the worm 106 and the worm wheel 107. Furthermore, this configuration is provided around the outer periphery of the rolling bearing 108, with an inner side ring fitted onto the rolling bearing 108, an outer side ring fitted into the fitting hole of the housing 110 and a ring-shaped elastic member for making the worm 106 eccentric with respect to the worm wheel 107. With this configuration, the meshing portion of the worm 106 and the worm wheel 107 is preliminary pressurized by the elastic restoring force of the elastic member. Hence, it is possible to absorb an allowable amount of eccentricity owing to the difference in the distance.

However, in the electric power steering apparatus wherein the worm 106 is made eccentric with respect to the worm wheel 107 by the elastic restoring force of the elastic member, the elastic restoring force of the elastic member is required to be made relatively small in order to make the rotation torque applied to the meshing portion of the worm 106 and the worm wheel 107 relatively small and to apply a necessary minimum preliminary pressure to the meshing portion of the worm 106 and the worm wheel 107. Hence, the worm 106 is pressed in its radial direction so as to be separated from the worm wheel 107 by a meshing reaction force applied to the meshing portion of the worm 106 and the worm wheel 107. As a result, the worm 106 is in danger of moving beyond the allowable amount of eccentricity owing to the minus tolerance of the distance between the rotation centers of the worm 106 and the worm wheel 107 and worsening the meshing with the worm wheel 107.

BRIEF SUMMARY OF THE INVENTION

The present invention is intended to provide an electric power steering apparatus capable of solving the above-mentioned problems.

An electric power steering apparatus in accordance with a first invention comprises a driving gear rotatably supported by bearing inside a housing and rotating interlocked with the rotation of a steering assist motor, and a driven gear meshing with the driving gear and connected to a steering mechanism so that steering is assisted by the rotation of the motor, characterized in that elastic members are provided on the outer periphery of the bearing to restrain the bearing from moving in the radial direction thereof, and that the restraining forces of the elastic members are made different depending on the position in the peripheral direction thereof.

In the first invention, the elastic members provided on the outer periphery of the bearing supporting the driving gear inside the housing are disposed so that a portion, wherein the force for restraining the movement of the bearing in the radial direction is small, is positioned in a first radial direction Y, and so that another portion, wherein the force for restraining the movement in the radial direction is large, is positioned in a second radial direction X. With this configuration, the amount of backlash at the meshing portion can be reduced by the elastic restoring forces of the elastic members. In addition, rotation torque applied to the meshing portion of the driving gear and the driven gear can be made relatively small. Furthermore, the amount of the movement of the driving gear in the second radial direction X can be made very small, whereby the driving gear can be prevented from being broken.

In accordance with a second invention, an electric power steering apparatus as set forth in the first invention is characterized in that the elastic members are disposed on one radial direction side portion and the other radial direction side portion of the bearing.

In the second invention, the elastic members are disposed on one radial direction side portion and the other radial direction side portion of the bearing in the second radial direction. With this configuration, the amount of the backlash at the meshing portion can be reduced by the elastic restoring forces of the elastic members. In addition, rotation torque applied to the meshing portion of the driving gear and the driven gear can be made relatively small. Furthermore, the amount of the movement of the driving gear can be made very small, whereby the driving gear can be prevented from being broken.

In accordance with a third invention, an electric power steering apparatus as set forth in the first invention is characterized in that a stopper for limiting the amount of the movement of the bearing in a direction wherein the force for restraining the movement of the bearing is small is provided.

In the third invention, when the driving gear is pressed so as to separate from the driven gear in the first radial direction Y by a meshing reaction force applied to the meshing portion of the driving gear and the driven gear, the elastic members are deflected and the stopper makes contact on the housing side, for example. This can prevent the bearing from excessively moving in the first radial direction Y, whereby the elastic restoring forces of the elastic members in the first radial direction Y can be made further smaller. Hence, the rotation torque applied to the meshing portion of the driving gear and the driven gear can be made further smaller.

In accordance with a fourth invention, an electric power steering apparatus as set forth in the first invention is characterized in that the elastic member is a circular disc having through holes at a plurality of peripheral positions.

In the fourth invention, the elastic member is disposed so that the through hole portions are positioned in the first radial direction Y. Hence, the amount of the backlash can be reduced by the elastic restoring force of the elastic member. In addition, rotation torque applied to the meshing portion of the driving gear and the driven gear can be made relatively small. Furthermore, the amount of the movement of the driving gear in the second radial direction X can be made very small, whereby the driving gear can be prevented from being broken. Moreover, since the elastic member is a disc, the durability of the elastic member can be raised.

In accordance with a fifth invention, an electric power steering apparatus as set forth in any one of the first to fourth inventions is characterized by comprising: an inner side ring fitted onto the bearing; and an outer side ring fitted into the housing; wherein the elastic member is joined to the inner side ring and the outer side ring.

In the fifth invention, the inner side ring, the outer side ring and the elastic member are integrated. Hence, by fitting (pressure-fitting) the outer periphery of the bearing into the inner periphery of the inner side ring and then by fitting the outer side ring into the housing, the bearing and the elastic member can be assembled inside the housing. Assembly workability is thus improved.

An electric power steering apparatus in accordance with a sixth invention comprises a driving gear rotatably supported by bearing inside a housing and rotating interlocked with the rotation of a steering assist motor, and a driven gear meshing with the driving gear and connected to a steering mechanism so that steering is assisted by the rotation of the motor, characterized by comprising: an inner side ring fitted onto the bearing; an outer side ring fitted into the housing; and an elastic member joined to both the inner side ring and the outer side ring to make the driving gear eccentric to the driven gear.

In the sixth invention, since the driven gear can be made eccentric to the driving gear by the elastic member, the amount of the backlash can be reduced. In addition, in the sixth invention, the elastic member itself is not fitted or secured but joined to the inner side ring and the outer side ring, and the inner side ring is fitted onto the bearing and the outer side ring is fitted into the housing. Hence, a preliminary pressure in the eccentric direction by the elastic member can be set in an appropriate range easily. In other words, although rotation torque applied to the meshing portion of the driving gear and the driven gear increases when the preliminary pressure in the eccentric direction is large, and backlash is liable to generate owing to the change of the meshing condition with the passage of time when the preliminary pressure in the eccentric direction is small, these can be prevented by the sixth invention.

Furthermore, in the sixth invention, by fitting (pressure-fitting) the outer periphery of the bearing into the inner periphery of the inner side ring and then by fitting the outer side ring into the housing while the inner side ring, the outer side ring and the elastic member are integrated, the bearing and the elastic member can be assembled inside the housing. Assembly workability of the elastic member is thus improved.

An electric power steering apparatus in accordance with a seventh invention comprises a driving gear rotatably supported by bearing inside a housing and rotating interlocked with the rotation of a steering assist motor, and a driven gear meshing with the driving gear and connected to a steering mechanism so that steering is assisted by the rotation of the motor, characterized by comprising: a ring fitted into the housing; and an elastic member joined to the ring and the bearing to make the driving gear eccentric to the driven gear.

In the seventh invention, since the driving gear can be made eccentric to the driven gear by the elastic member, the amount of the backlash can be reduced. In addition, in the seventh invention, the elastic member itself is not fitted or secured but joined to the ring, and the ring is fitted into the housing. Hence, a preliminary pressure in the eccentric direction by the elastic member can be set in an appropriate range easily.

Furthermore, in the seventh invention, by fitting the ring into the housing while the bearing, the ring and the elastic member are integrated, the bearing and the elastic member can be assembled inside the housing. Assembly workability of the elastic member is thus improved.

In accordance with an eighth invention, an electric power steering apparatus as set forth in the sixth or seventh invention is characterized in that the bearing is rolling bearing, and that the axial position of the driving gear is set at a position wherein a thrust load is applied from the driving gear to the elastic member via the rolling bearings and the elastic member is deflected by the thrust load.

In the eighth invention, since the elastic member for making the driving gear eccentric to the driven gear is deflected in the direction of the thrust load and the elastic member applies the thrust load to the driving gear, it is possible to prevent the driving gear from rattling in the axial direction. Furthermore, in the eighth invention, the thrust load is applied elastically. Hence, the rotation torque of the driving gear can be made small, and the frictional resistance thereof can be reduced.

In accordance with a ninth invention, an electric power steering apparatus as set forth in the eighth invention is characterized in that the elastic member is a circular disc.

In the ninth invention, the radial dimension of the elastic member can be made relatively large. Hence, the elastic member can be deflected easily in the direction of the thrust load, and the thrust load applied from the elastic member to the driving gear can be made small easily.

In accordance with a tenth invention, an electric power steering apparatus as set forth in the ninth invention is characterized by further comprising a positioning member for adjusting the axial position of the driving gear.

In the tenth invention, the elastic member can be deflected by adjusting the axial position of the driving gear by operating the positioning member. Hence, an appropriate thrust load can be applied to the driving gear.

In accordance with an eleventh invention, an electric power steering apparatus as set forth in the tenth invention is characterized in that the positioning member is a screw ring screwed into the housing, that the bearings comprising one pair each fitted onto one of both end portions of the driving gear, respectively, that one of the bearings is held inside the housing via the elastic member and the other bearing is disposed at a position facing the screw ring, and that an elastic ring is provided between the other bearing and the screw ring.

In the eleventh invention, a thrust load is applied from the other bearing to the driving gear via the elastic ring by rotating the screw ring. Furthermore, the elastic member is deflected in the thrust load direction via the one bearing. Hence, the elastic member and the elastic ring apply the thrust loads to the driving gear elastically. As a result, the rotation torque of the driving gear can be made small, and the frictional resistance thereof can be reduced.

An electric power steering apparatus in accordance with a twelfth invention comprises a driving gear rotatably supported by bearing inside a housing and rotating interlocked with the rotation of a steering assist motor, and a driven gear meshing with the driving gear and connected to a steering mechanism so that steering is assisted by the rotation of the motor, characterized by comprising: an inner side ring fitted onto the outer periphery of the bearing; an outer side ring fitted into the housing; and an elastic member joined to both of the inner side ring and the outer side ring to make the driving gear eccentric to the driven gear, wherein a stopper is provided on one of the inner side ring or the outer side ring to limit the amount of the deflection of the elastic member by making contact with another of the inner side ring or the outer side ring, or the housing.

In the twelfth invention, the elastic member is provided on the outer periphery of the bearing for supporting the driving gear inside the housing. Hence, the amount of the backlash at the meshing portion can be reduced by the elastic restoring force of the elastic member. In addition, rotation torque applied to the meshing portion of the driving gear and the driven gear can be made relatively small. Furthermore, in the twelfth invention, when the driving gear is separated from the driven gear in the radial direction by a meshing reaction force applied to the meshing portion of the driving gear and the driven gear, the stopper makes contact with the inner side ring or the outer side ring, or the housing. Hence, it is possible to limit the amount of the deflection of the elastic member. As a result, the driving gear can be prevented from moving beyond its allowable amount of eccentricity, and the meshing condition of the two gears can be made proper.

In accordance with a thirteenth invention, an electric power steering apparatus as set forth in the twelfth invention is characterized in that the stopper has the shape of a disc extended in the radial direction.

In the thirteenth invention, the stopper can be installed inside the housing without considering the position of the stopper with respect to the driven gear. Hence, the elastic member joined to the inner side ring and the outer side ring can be assembled easily. Assembly workability is thus improved.

An electric power steering apparatus in accordance with a fourteenth invention comprises a driving gear rotatably supported by bearing inside a housing and rotating interlocked with the rotation of a steering assist motor, and a driven gear meshing with the driving gear and connected to a steering mechanism so that steering is assisted by the rotation of the motor, characterized by comprising: an inner side ring fitted onto the outer periphery of the bearing; an outer side ring fitted into the housing; and an elastic member joined to both of the inner side ring and the outer side ring to make the driving gear eccentric to the driven gear, wherein the driving gear has an extended shaft portion extended outward from the support portion supported by the bearing inside the housing, and a stopper is provided on at least one of the extended shaft portion or the housing to limit the amount of the deflection of the elastic member by making contact with another of the extended shaft portion or the housing.

In the fourteenth invention, the elastic member is provided on the outer periphery of the bearing for supporting the driving gear inside the housing. Hence, the amount of the backlash at the meshing portion can be reduced by the elastic restoring force of the elastic member. In addition, rotation torque applied to the meshing portion of the driving gear and the driven gear can be made relatively small. Furthermore, in the fourteenth invention, when the driving gear is separated from the driven gear in the radial direction by a meshing reaction force applied to the meshing portion of the driving gear and the driven gear, the stopper makes contact with the extended shaft portion or the housing. Hence, it is possible to limit the amount of the deflection of the elastic member. As a result, the driving gear can be prevented from moving beyond its allowable amount of eccentricity, and the meshing condition of the two gears can be made proper. Furthermore, since the stopper is provided independently of the inner side ring and the outer side ring, when the elastic member is bonded by vulcanization to the inner side ring and the outer side ring, bonding work by vulcanization can be carried out easily on both sides of the inner side ring and the outer side ring without being obstructed by the stopper. Workability can thus be improved.

In accordance with a fifteenth invention, an electric power steering apparatus as set forth in the fourteenth invention is characterized in that the housing has a recess hole into which the extended shaft portion is inserted, and that the stopper is a ring attached to at least one of the extended shaft portion or in the recess hole.

In the fifteenth invention, the ring can be made of a material having small frictional resistance. Hence, the rotation performance of the driving gear can be made proper while the stopper makes contact.

The above and further objects and features of the invention will more fully be apparent from the following detailed description with accompanying drawings.

DETAILED DESCRIPTION OF THE INVENTION

The present invention will be detailed below referring to the accompanying drawings showing the embodiments thereof.

Embodiment 1

Figure 1:
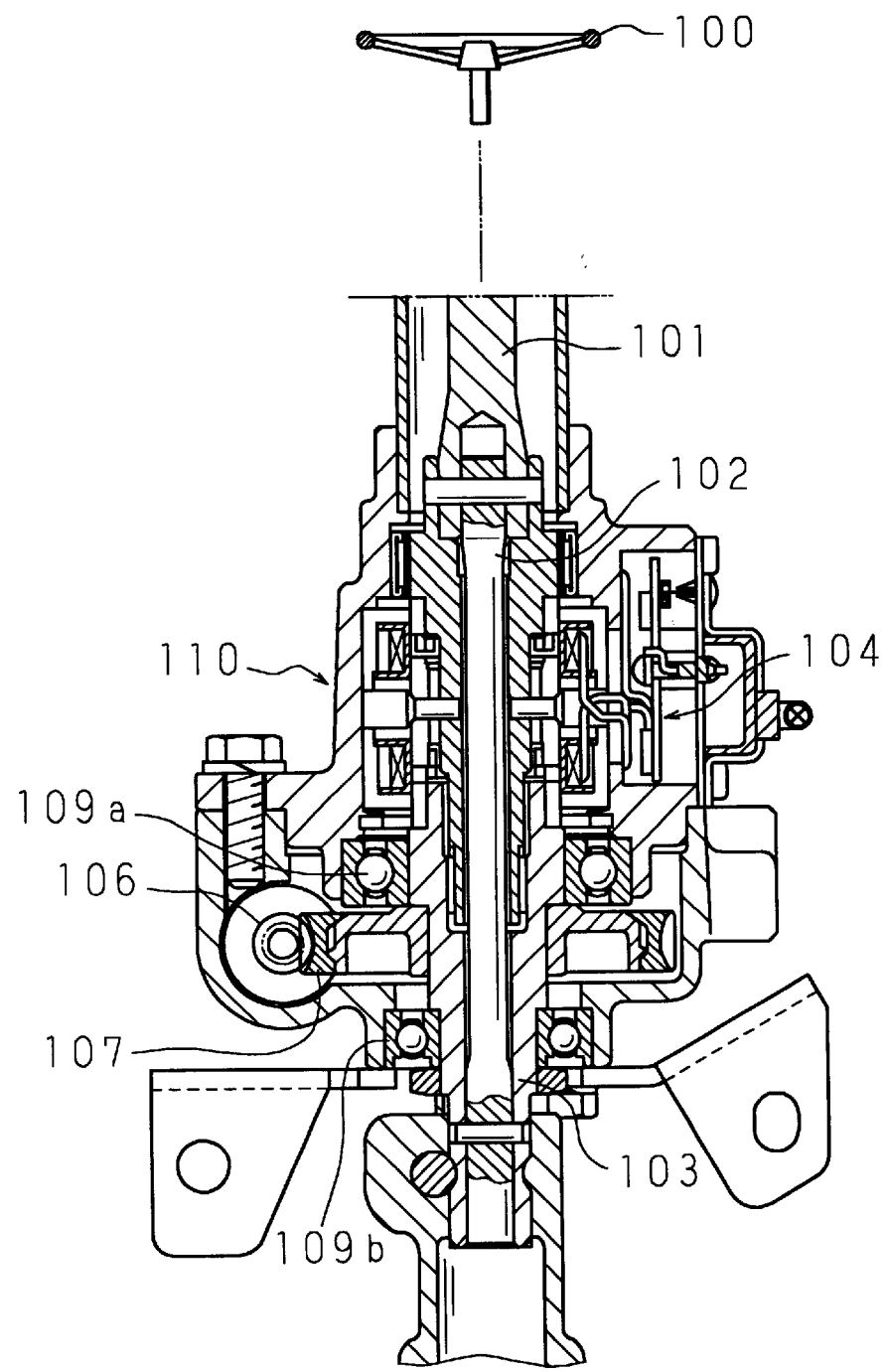
FIG. 1 is a sectional view showing the conventional electric power steering apparatus.
Figure 2:
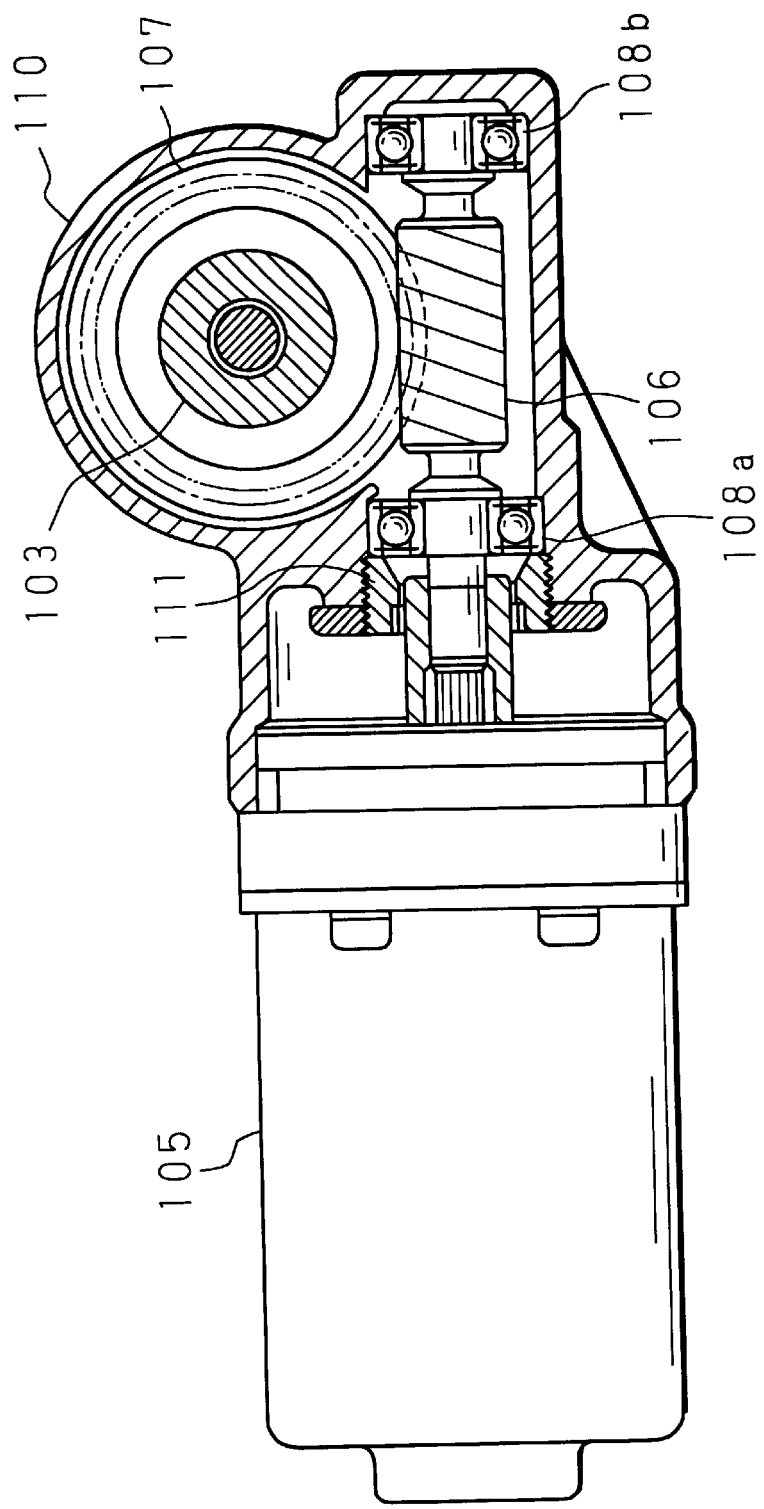
FIG. 2 is a sectional view showing the reduction mechanism portion of the conventional electric power steering apparatus.
Figure 3:
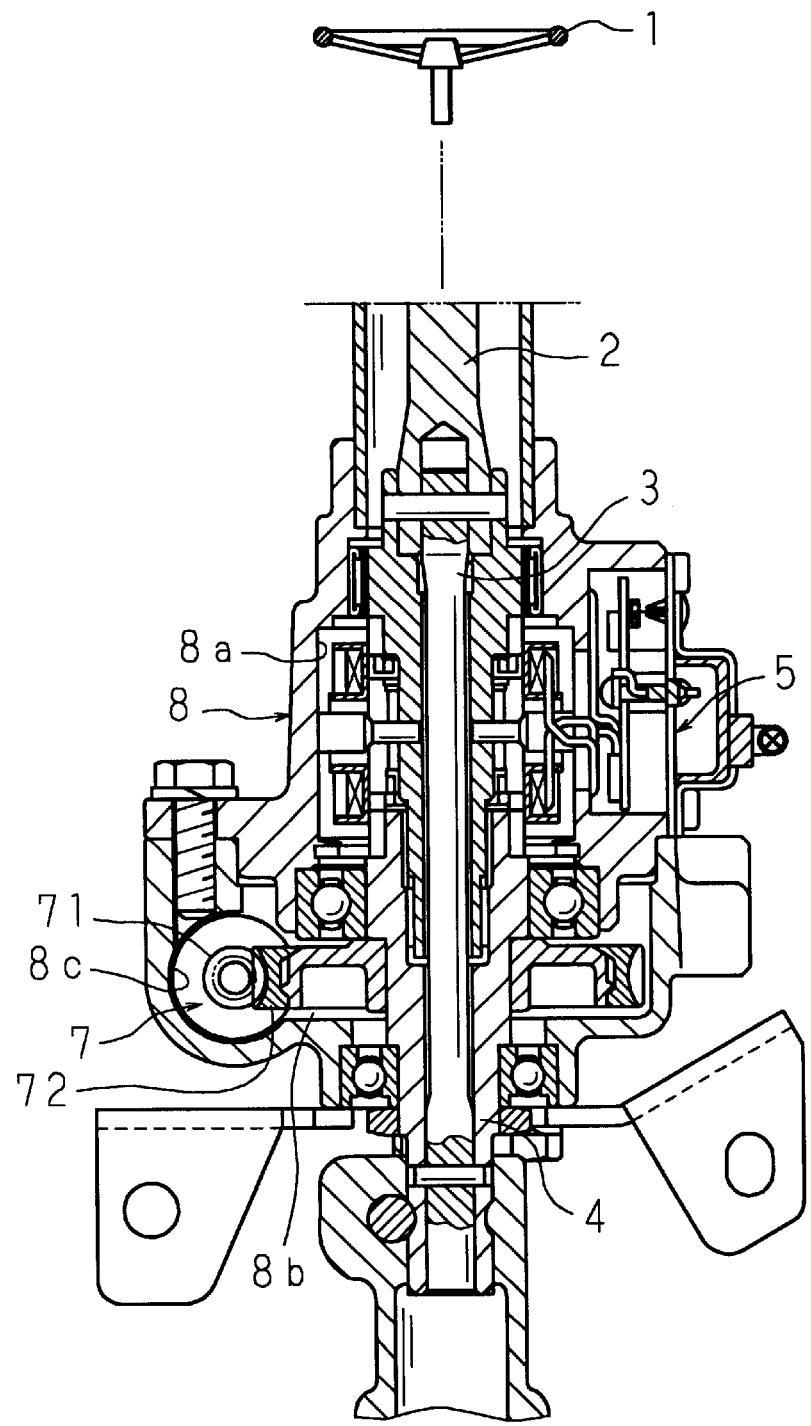
FIG. 3 is a sectional view showing an electric power steering apparatus in accordance with the present invention.

FIG. 3 is a sectional view showing an electric power steering apparatus in accordance with the present invention.

The electric power steering apparatus comprises: a first steering shaft 2 whose one end portion is connected to a steering wheel 1 for steering and other end portion has a cylindrical portion; a torsion bar 3 being inserted into the cylindrical portion, whose one end portion is coaxially connected to the other end portion of the steering shaft 2, and which is distorted by steering torque applied to the steering wheel 1; a second steering shaft 4 whose one end portion is fitted around the cylindrical portion and other end portion is coaxially connected to the other end portion of the torsion bar 3; a torque sensor 5 for detecting the steering torque applied to the steering wheel 1 owing to the amounts of the relative rotation displacement of the first and second steering shafts 2 and 4 depending on the distortion of the torsion bar 3; a steering assist motor 6 (see FIG. 4) driven on the basis of the torque detected by the torque sensor 5; a reduction mechanism 7 having a small-diameter driving gear 71 (hereafter referred to as a worm) and a driven gear 72 (hereafter referred to as a worm wheel), rotating interlocked with the rotation of the motor 6 to reduce the speed of the rotation and to transmit the rotation to the second steering shaft 4; and a housing 8 for housing the torque sensor 5 and the reduction mechanism 7. The motor 6 is attached to the housing 8.

The housing 8 is provided with a first housing portion 8a for housing the torque sensor 5, a second housing portion 8b for housing the worm wheel 72 and a third housing portion 8c for housing the worm 71. The second housing portion 8b is formed so as to be continuous to the first housing portion 8c, and the third housing portion 8c is formed so as to be continuous to the second housing portion 8b.

Figure 4:
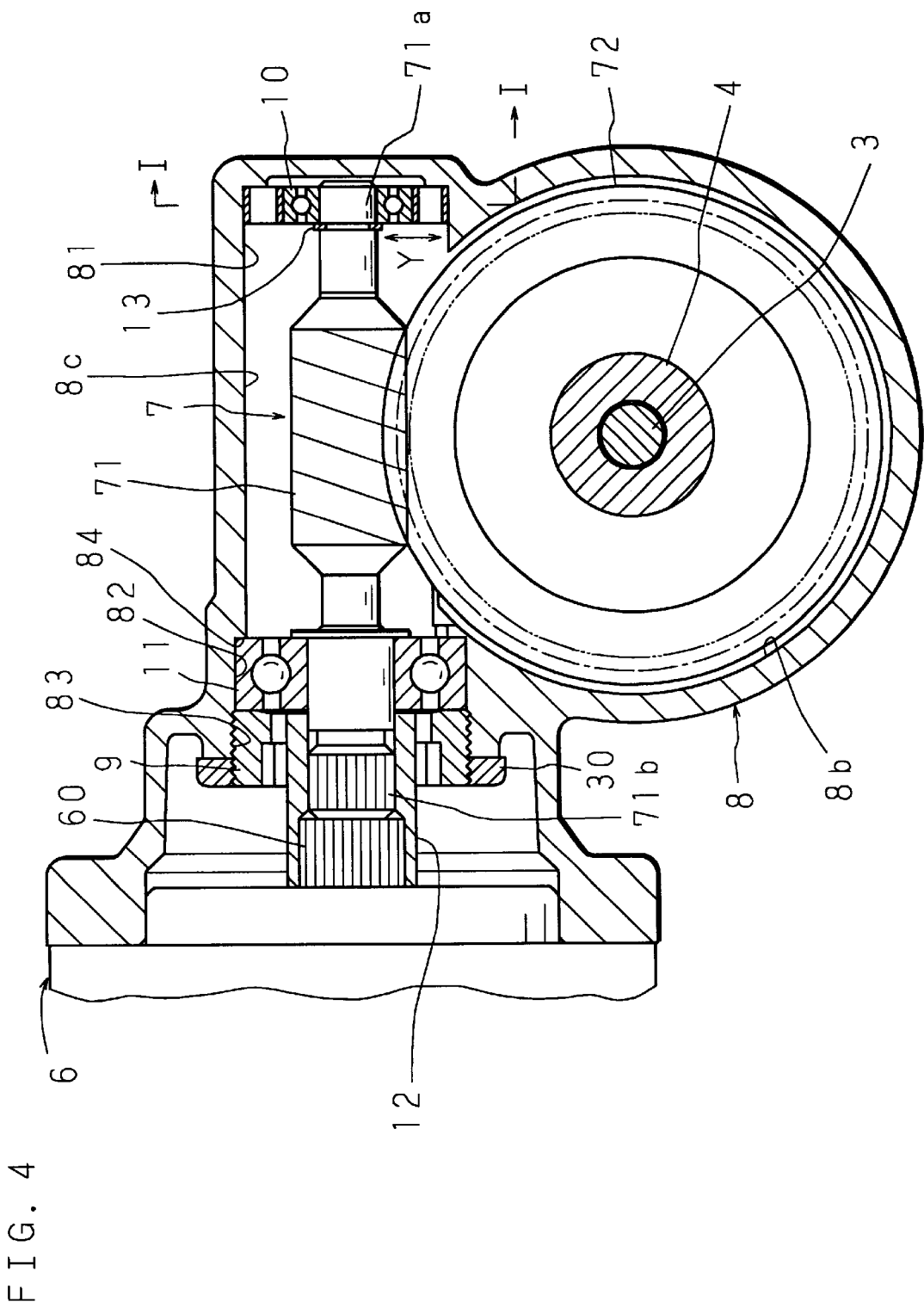
FIG. 4 is a sectional view showing the reduction mechanism portion of the electric power steering apparatus in accordance with the present invention.

FIG. 4 is a sectional view showing the reduction mechanism portion in accordance with Embodiment 1.

The third housing portion 8c extends in the axial direction of the worm 71 and being provided with a first fitting hole 81 at one end portion thereof in its longitudinal direction. In addition, a second fitting hole 82 and a screw hole 83 being continuous to the second fitting hole 82 are provided at the other end portion of the third housing portion 8c. A screw ring 9 is screwed into the screw hole 83. In addition, the motor 6 having a case communicating with the third housing portion 8c is attached to the housing 8.

A lock nut 30 is screwed onto the screw ring 9 to restrain the worm 71 from moving in its axial direction.

The reduction mechanism 7 is provided with the worm 71 having a shaft portion 71a connected to the output shaft 60 of the motor 6, and the worm wheel 72 fitted onto the intermediate portion of the second steering shaft 4 and secured thereto. The rotation speed of the output shaft 60 is reduced by the meshing of the worm 71 and the worm wheel 72, and the rotation is transmitted to the second steering shaft 4. The rotation is further transmitted from the second steering shaft 4 to for example a rack-and-pinion steering mechanism (not shown) via a universal joint.

The worm 71 is disposed so as to intersect the axis of the second steering shaft 4. The inner ring of a first rolling bearing 10 is fitted onto the shaft portion 71a at one end portion of the worm 71. Rubber elastic members 20 (see FIG. 5) secured to the outer ring of the first rolling bearing 10 are fitted into the first fitting hole 81. Hence, the shaft portion 71a at one end portion of the worm 71 is rotatably supported in the first fitting hole 81, and the shaft portion 71b at the other end portion of the same is rotatably supported in the second fitting hole 82 via the second rolling bearing 11. The screw ring 9 screwed into the screw hole 83 makes contact with the outer ring of the second rolling bearing 11. The second rolling bearing 11 is thus restrained from moving in its axial direction by a contact portion 84 of the screw ring 9 and the fitting hole 82. In addition, the shaft portion 71b at the other end portion of the worm 71 is spline-fitted into the inner surface of a joint tube 12 and connected to the output shaft 60. Furthermore, a stopper ring 13 is provided on the shaft portion 71a at the one end portion of the worm 71 to restrain the worm 71 from moving in the direction opposite to the motor 6.

Figure 5:
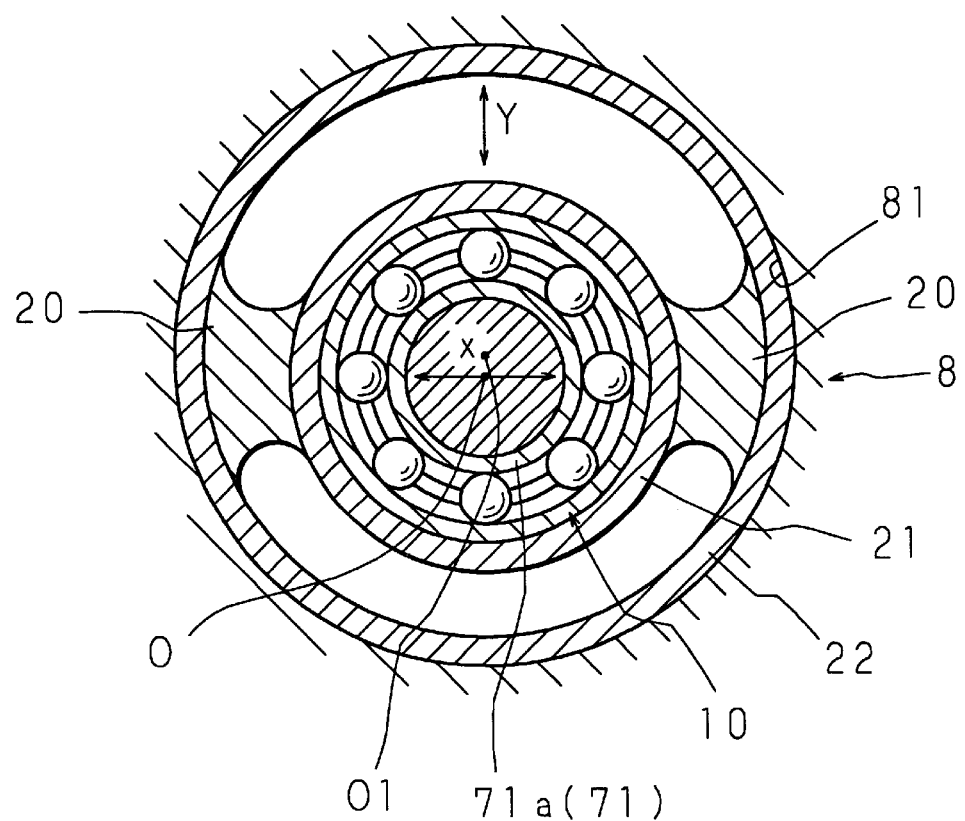
FIG. 5 is a magnified sectional view taken on line I—I of FIG. 4.
Figure 6:
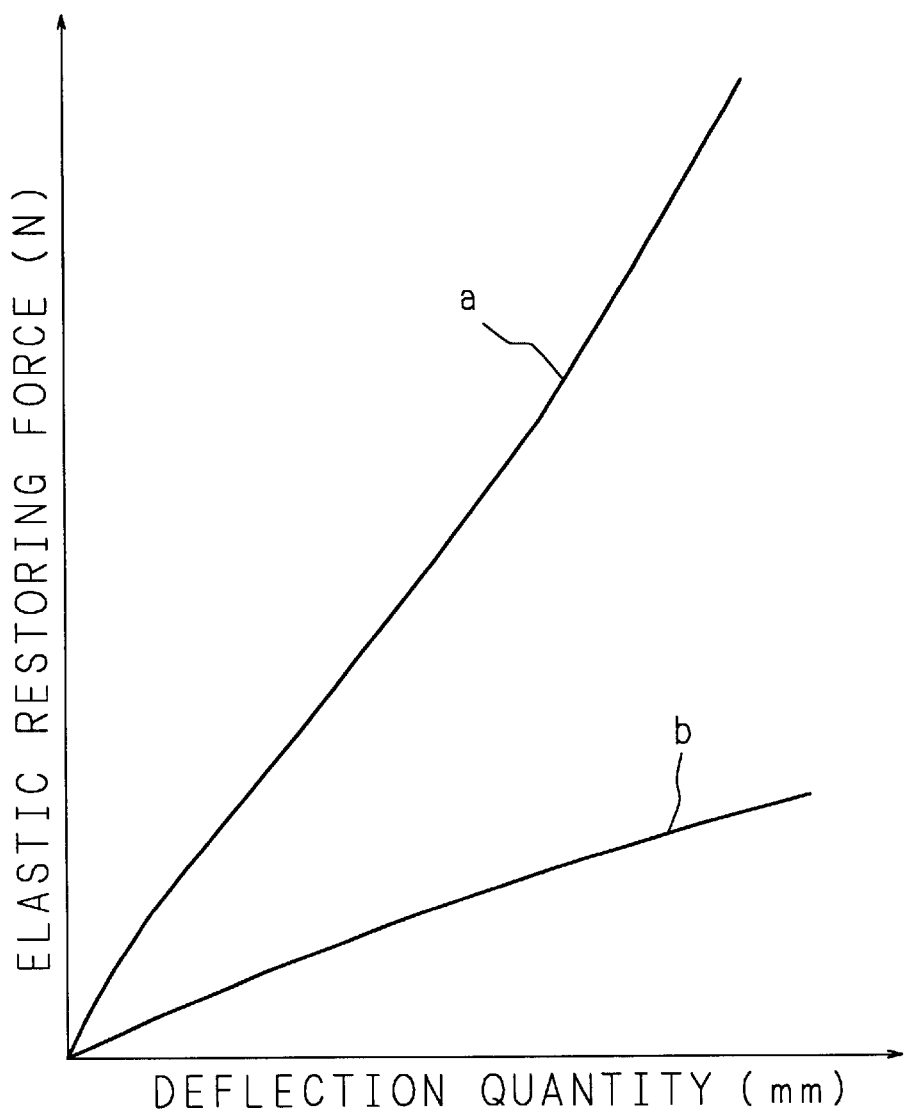
FIG. 6 is a graph showing the relationship between the amount of deflection in the radial direction and the elastic restoring force in the radial direction of the elastic member of the electric power steering apparatus in accordance with the present invention.

FIG. 5 is a magnified sectional view taken on line I—I of FIG. 4, and FIG. 6 is a graph showing the relationship between the amount of deflection in the radial direction and the elastic restoring force in the radial direction of the elastic member 20.

The elastic members 20 are disposed on one radial direction side portion and on the other radial direction side portion of the first rolling bearing 10 to restrain the first rolling bearing 10 from moving in the radial direction. The restraint force of the elastic members 20 is made relatively large on the one radial direction side portion and the other radial direction side portion in the second radial direction X (curve a in FIG. 6), and is made relatively small in a portion being the first radial direction Y between the one radial direction side portion and the other radial direction side portion (curve b in FIG. 6).

As described above, the elastic members 20, 20 disposed on the one radial direction side portion and the other radial direction side portion of the first rolling bearing 10 are bonded by vulcanization to the outer peripheral surface of the metallic inner side ring 21 fitted onto the outer ring of the first rolling bearing 10, and is also bonded by vulcanization to the inner peripheral surface of the metallic outer side ring 22 having a diameter larger than that of the inner side ring 21 and fitted into the first fitting hole 81. In the non-assembled state, the center O of the inner side ring 21 is eccentric to the meshing portion side in the first radial direction Y with respect to the center O1 of the outer side ring 22. However, when the inner side ring 21 is assembled with the worm 71, the elastic restoring forces of the elastic members 20, 20 apply to the inner side ring 21 in the first radial direction Y. The worm 71 is thus energized toward the meshing point of the worm 71 and the worm wheel 72. In addition, the elastic members 20, 20 are formed into plate like shape, and both side surfaces in the peripheral direction are semi-circularly curved surfaces so as to be joined strongly to the inner side ring 21 and the outer side ring 22.

In Embodiment 1, when the worm 71 is assembled, for example, when the outer periphery of the first rolling bearing 10 is pressure-fitted into the inner periphery of the inner side ring 21 while the inner side ring 21, the outer side ring 22 and the elastic members 20, 20 are integrated, the outer side ring 22 is pressure-fitted into the first fitting hole 81 of the housing 8 and secured thereto so that the direction orthogonal to the elastic members 20, 20 is the first radial direction Y and on the side of the meshing point. After this, the worm 71 is inserted from the second fitting hole 82 to the third housing portion 8c, and the shaft portion 71a on the one side of the worm 71 is fitted into the inner ring of the first rolling bearing 10 and supported thereby. Next, the second rolling bearing 11 is fitted into the second fitting hole 82 and onto the shaft portion 71b at the other end portion of the worm 71, and the screw ring 9 is screwed into the screw hole 83. Hence, the outer ring of the second rolling bearing 11 is held between the contact portion 84 and the screw ring 9. As a result, by tightening the lock nut 30, the worm 71 is restrained from moving in its axial direction, and the worm 71 can be energized to the meshing point side of the worm 71 and the worm wheel 72 by the elastic restoring forces of the elastic members 20, 20.

The elastic members 20, 20 for restraining the first rolling bearing 10 assembled together with the worm 71 from moving in the radial direction are disposed at positions in the second radial direction X. Furthermore, the forces of the elastic members 20, 20 for restraining the first rolling bearing 10 from moving in the first radial direction Y are made relatively small. Hence, these small forces of the elastic members 20, 20 energize the first rolling bearing 10 in the first radial direction Y and energize the worm 71 toward the meshing portion of the worm 71 and the worm wheel 72. For this reason, the amount of the backlash at the meshing portion of the worm 71 and the worm wheel 72 can be reduced, and the rotation torque applied to the meshing portion of the worm 71 and the worm wheel 72 can be made relatively small. Hence, the rotation performance of the worm 71 can be enhanced. Furthermore, even when the meshing condition changes with time owing to increased amounts of wear at the teeth of the worm 71 and the worm wheel 72, the amount of the backlash can be reduced.

In addition, since the elastic members 20, 20 are disposed at positions in the second radial direction X, and the forces for restraining the first rolling bearing 10 from moving in the second radial direction X are made relatively large, the amount of the movement of the shaft portion 71a at the one end portion of the worm 71 in the second radial direction X can be reduced significantly. This prevents the worm 71 from suffering accidents, such as breakage.

Embodiment 2

Figure 7:
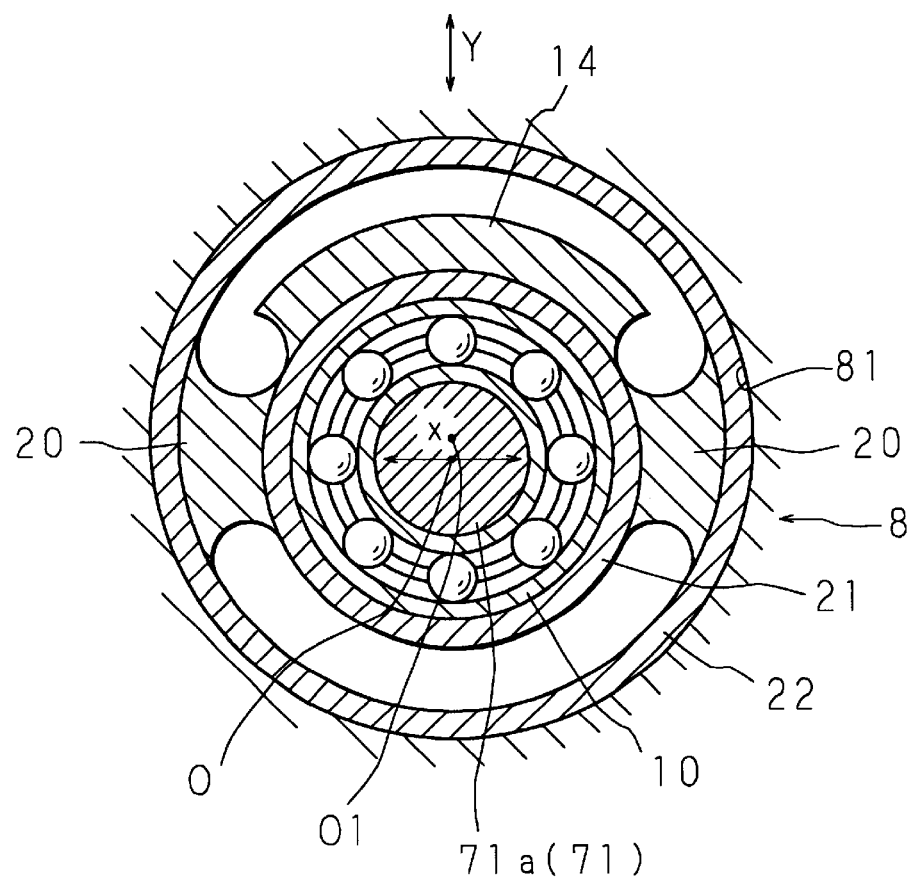
FIG. 7 is a magnified sectional view showing a worm support portion in accordance with Embodiment 2 of the electric power steering apparatus of the present invention.

FIG. 7 is a magnified sectional view showing a worm support portion in accordance with Embodiment 2.

In an electric power steering apparatus in accordance with Embodiment 2, the elastic members 20, 20 are disposed at positions in the second radial direction X just as in the case of Embodiment 1. The forces of the elastic members 20, 20 for restraining the first rolling bearing 10 from moving in the second radial direction X are made relatively large, and the forces for restraining the first rolling bearing 10 from moving in the first radial direction Y are made relatively small. A rubber stopper 14 is further provided on the anti-eccentric side of the inner side ring 21 at a position wherein the forces of the elastic members 20, 20 for restraining the first rolling bearing 10 from moving in the first radial direction Y are made relatively small in order to limit the amount of the movement of the first rolling bearing 10 in the radial direction. This stopper 14 is bonded by vulcanization to the outer peripheral surface of the inner side ring 21 together with the elastic members 20, 20. An appropriate gap is provided between the stopper 14 and the inner periphery of the outer side ring 22.

Furthermore, the stopper 14 is formed into an arc nearly concentric with the inner side ring 21. However, its shape is not limited particularly.

In Embodiment 2, when the worm 71 is pressed so as to separate from the worm wheel 72 in the first radial direction Y by a meshing reaction force applied to the meshing portion of the worm 71 and the worm wheel 72, the elastic members 20, 20 are deflected and the stopper 14 makes contact with the inner periphery of the outer side ring 22, thereby being capable of stopping the first rolling bearing 10 from moving further in the first radial direction Y and preventing the bearing 10 from moving excessively in the first radial direction Y. As a result, the elastic restoring force of the elastic member 20 can be made further smaller. Furthermore, the rotation torque applied to the meshing portion of the worm 71, i.e., a gear having a small diameter, and the worm wheel 72, i.e., a gear having a large diameter, can be made further smaller.

Since the other configurations and operations are similar to those of Embodiment 1, similar components are designated by the same numerals, and the explanations of their details and operations are omitted.

In Embodiments 1 and 2, the elastic member 20 may be made of synthetic resin or may be formed of a plate spring made of metal, secured to the inner side ring 21 and the outer side ring 22, instead of rubber. In addition, the stopper 14 may be made of synthetic resin or metal secured to the outer periphery of the inner side ring 21 or the inner periphery of the outer side ring 22, instead of rubber. Furthermore, the inner side ring 21 and the outer side ring 22 may be made of synthetic resin instead of metal.

Embodiment 3

Figure 8:
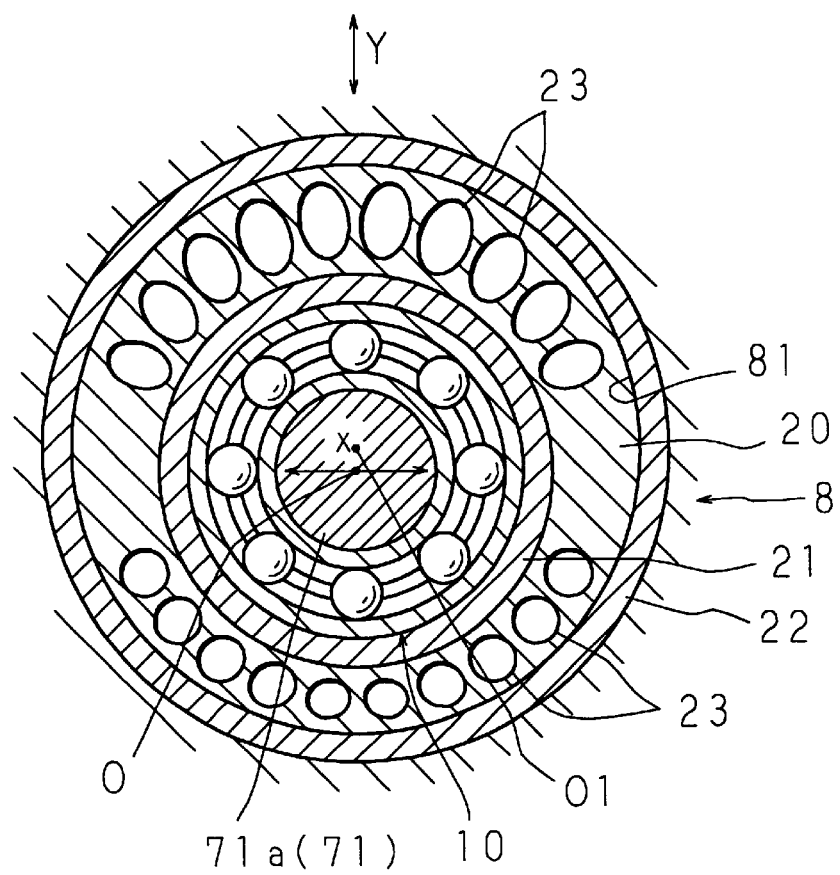
FIG. 8 is a magnified sectional view showing a worm support portion in accordance with Embodiment 3 of the electric power steering apparatus of the present invention.

FIG. 8 is a magnified sectional view showing a worm support portion in accordance with Embodiment 3.

In an electric power steering apparatus in accordance with Embodiment 3, instead of disposing the elastic members 20, 20 only at positions in the second radial direction X just as in the case of Embodiment 1, the elastic member 20 made of rubber is formed into a circular disc having a plurality of through holes 23, . . . at two peripheral positions in the first radial direction Y. By virtue of these through holes 23, . . . , the force of the elastic member 20 for restraining the first rolling bearing 10 from moving in the first radial direction Y is made relatively small, and by virtue of the portions not having the through holes 23, . . . , the force for restraining the first rolling bearing 10 from moving in the second radial direction X is made relatively large.

The elastic member 20 of Embodiment 3 is bonded by vulcanization to the outer peripheral surface of the inner side ring 21 and to the inner peripheral surface of the outer side ring 22. Recesses may be formed instead of the through holes 23.

Since the other configurations and operations are similar to those of Embodiment 1, similar components are designated by the same numerals, and the explanations of their details and operations are omitted.

Embodiment 4

Figure 9:
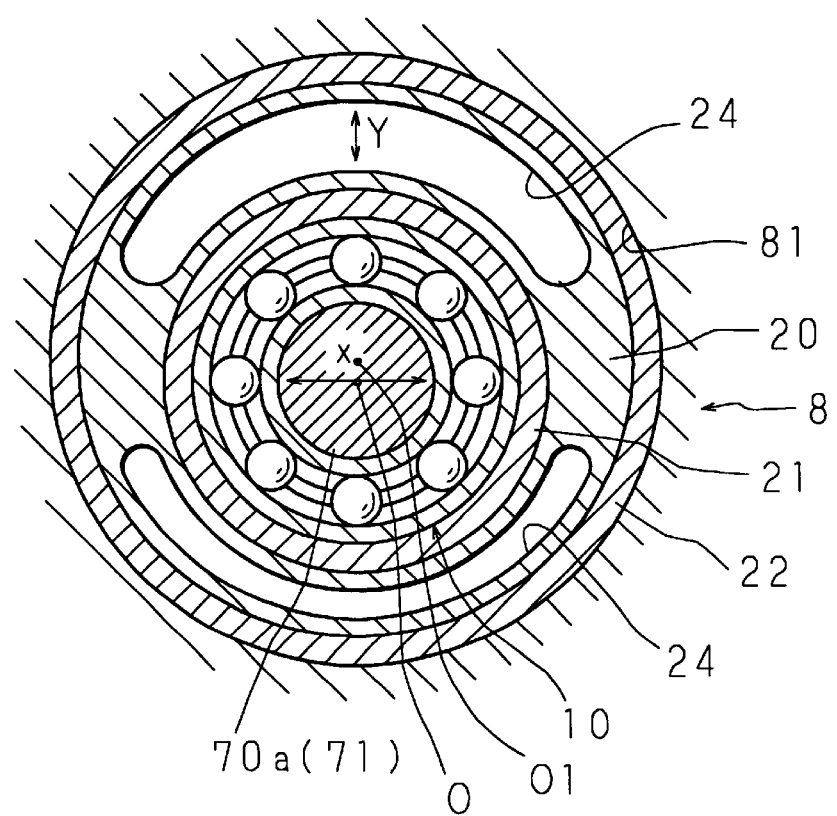
FIG. 9 is a magnified sectional view showing a worm support portion in accordance with Embodiment 4 of the electric power steering apparatus of the present invention.

FIG. 9 is a magnified sectional view showing a worm support portion in accordance with Embodiment 4.

In an electric power steering apparatus in accordance with Embodiment 4, instead of forming a plurality of through holes 23, . . . at two peripheral positions in the first radial direction Y just as in the case of Embodiment 3, oval through holes 24, 24 are formed at two positions in the first radial direction Y. By virtue of these through holes 24, 24, the force of the elastic member 20 for restraining the first rolling bearing 10 from moving in the first radial direction Y is made relatively small, and by virtue of the portions not having the through holes 24, 24, the force for restraining the first rolling bearing 10 from moving in the second radial direction X is made relatively large.

The elastic member 20 of Embodiment 4 is bonded by vulcanization to the outer peripheral surface of the inner side ring 21 and to the inner peripheral surface of the outer side ring 22. Recesses may be formed instead of the through holes 24, 24. In addition, when the through holes 24, 24 are through holes, the stopper 14 may be provided in the through hole 24 on the anti-eccentric side of the inner side ring 21 at a position wherein the force for restraining the first rolling bearing 10 from moving in the first radial direction Y is made small just as in the case of Embodiment 2.

Since the other configurations and operations are similar to those of Embodiments 1 to 3, similar components are designated by the same numerals, and the explanations of their details and operations are omitted.

In Embodiments 3 and 4, the elastic member 20 may be made of synthetic resin secured to the inner side ring 21 and the outer side ring 22, instead of rubber.

Furthermore, in Embodiments 1 to 4 described above, the inner side ring 21 secured to the elastic member 20 is made eccentric with respect to the center of the outer side ring 22. However, instead of this, the inner side ring 21 may be concentric with the outer side ring 22, and the center of the first fitting hole 81 may be made eccentric with respect to the center of the second fitting hole 82, thereby to energize the first rolling bearing 10 in the first radial direction Y and to energize the worm 71 to the meshing portion of the worm 71 and the worm wheel 72 by virtue of the elastic member 20.

Furthermore, in Embodiments 1 to 4 described above, the inner side ring 21 and the outer side ring 22 secured to the elastic member 20 are used.

However, instead of this, for example, the elastic member 20 may be secured to the outer ring of the first rolling bearing 10 by using securing means, such as bonding by vulcanization, while the inner side ring 21 is eliminated, or the elastic member 20 may be secured to the first fitting hole 81, while the outer side ring 22 is eliminated. When the elastic member 20 is secured to the first fitting hole 81, a rotation stopping projection for stopping the rotation of the elastic member 20, a fitting groove into which the elastic member 20 is fitted, or the like may be formed inside the housing. In this case, a fitting portion to be fitted onto the rotation stopping projection or fitted into the fitting groove is formed at the elastic member 20.

Furthermore, in Embodiments 3 and 4, the elastic member 20 itself may be fitted into the first fitting hole 81 and secured thereto.

Furthermore, in Embodiments 1 to 4 described above, the shaft portion 71a at the one end portion of the worm 71 is supported at the housing 8 by using the first rolling bearing 10, and the elastic member 20 is provided on the outer periphery of the first rolling bearing 10. However, a sliding bearing may be used instead of the first rolling bearing 10, and the elastic member 20 may be provided on the outer periphery of the sliding bearing.

Embodiment 5

Figure 10:
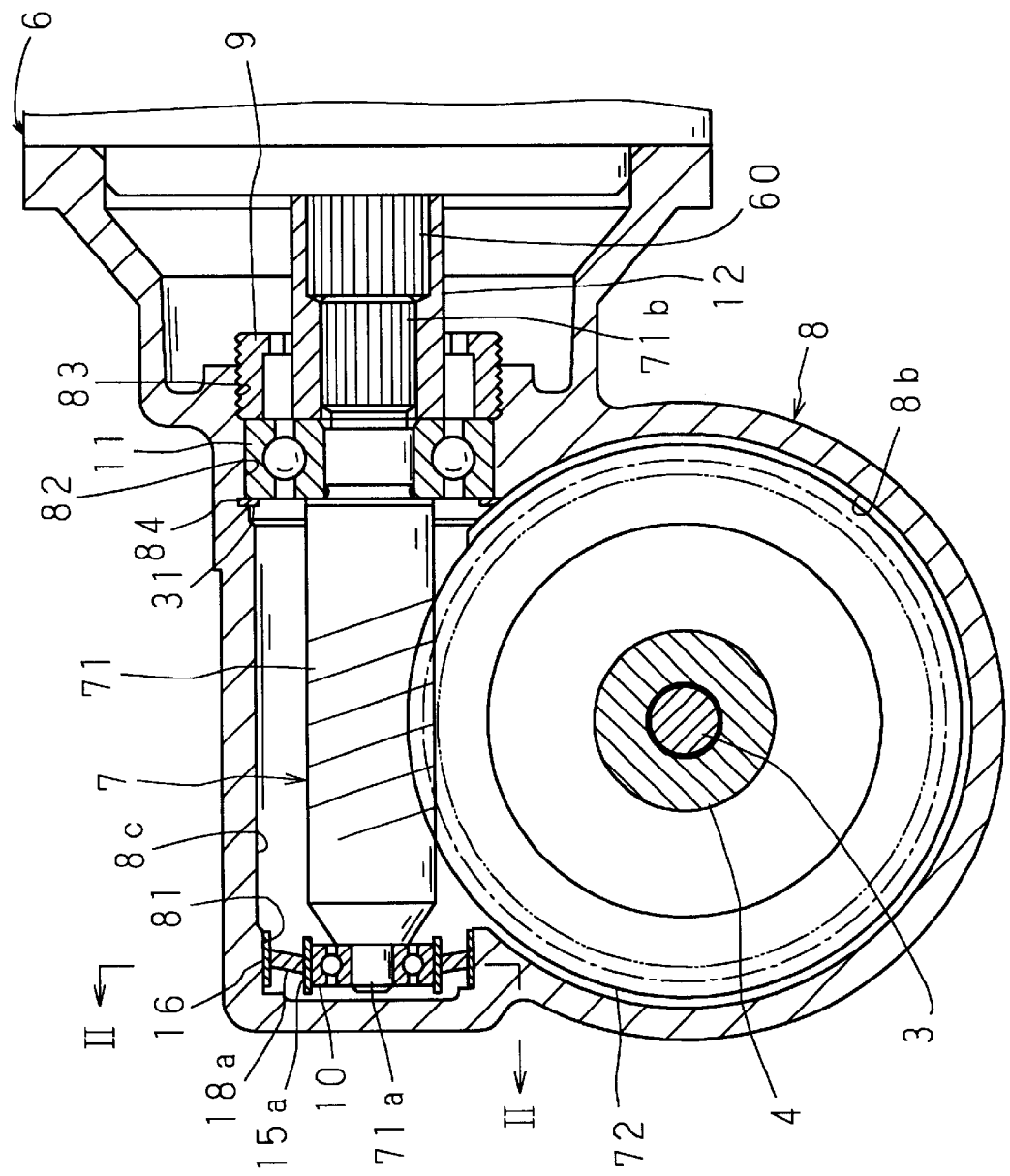
FIG. 10 is a sectional view showing a reduction mechanism portion in accordance with Embodiment 5 of the electric power steering apparatus of the present invention.

FIG. 10 is a sectional view showing a reduction mechanism portion in accordance with Embodiment 5.

The third housing portion 8c extends in the axial direction of the worm 71 and is provided with the first fitting hole 81 at one end portion thereof in its longitudinal direction. The second fitting hole 82 having a circular groove 84 and the screw hole 83 being continuous to the second fitting hole 82 are formed at the other end portion of the third housing portion 8c. The screw ring 9 (positioning member) for adjusting the axial position of the worm 71 is screwed into the screw hole 83. In addition, a stopper ring 31, described later, for making contact with the second rolling bearing 11 and for stopping the movement of the second rolling bearing 11 in the axial direction of the worm 71 is removably fitted into the circular groove 84. Furthermore, the motor 6 having a case being communicating with the third housing portion 8c is installed in the housing 8.

The reduction mechanism 7 is provided with the worm 71 having the shaft portions 71a and 71b connected to the output shaft 60 of the motor 6, and the worm wheel 72 fitted onto the intermediate portion of the second steering shaft 4 and secured thereto. The rotation speed of the output shaft 60 is reduced by the meshing of the worm 71 and the worm wheel 72, and the rotation is transmitted to the second steering shaft 4. The rotation is further transmitted from the second steering shaft 4 to for example a rack-and-pinion steering mechanism (not shown) via a universal joint.

The worm 71 is disposed so as to intersect the axis of the second steering shaft 4. The inner ring of the first rolling bearing 10 is pressure-fitted onto the shaft portion 71a at the one end portion of the worm 71. The shaft portion 71a at the one end portion of the worm 71 is rotatably supported in the first fitting hole 81 via a rubber elastic member 18a for making the worm 71 eccentric with respect to the worm wheel 72. The shaft portion 71b at the other end portion of the worm 71 is rotatably supported in the second fitting hole 82 via the second rolling bearing 11. The position of the worm 71 in its axial direction is adjusted via the second rolling bearing 11 by tightening the screw ring 9 screwed into the screw hole 83. In addition, the shaft portion 71b at the other end portion of the worm 71 is spline-fitted into the inner surface of the joint tube 12 and connected to the output shaft 60.

Figure 11:
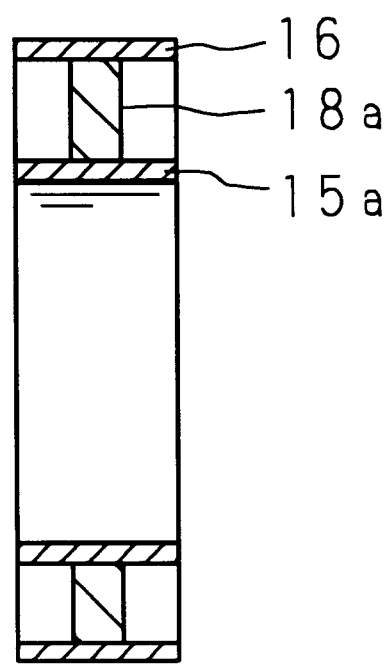
FIG. 11 is a vertical sectional view showing an elastic member in accordance with Embodiment 5 of the electric power steering apparatus of the present invention.
Figure 12:
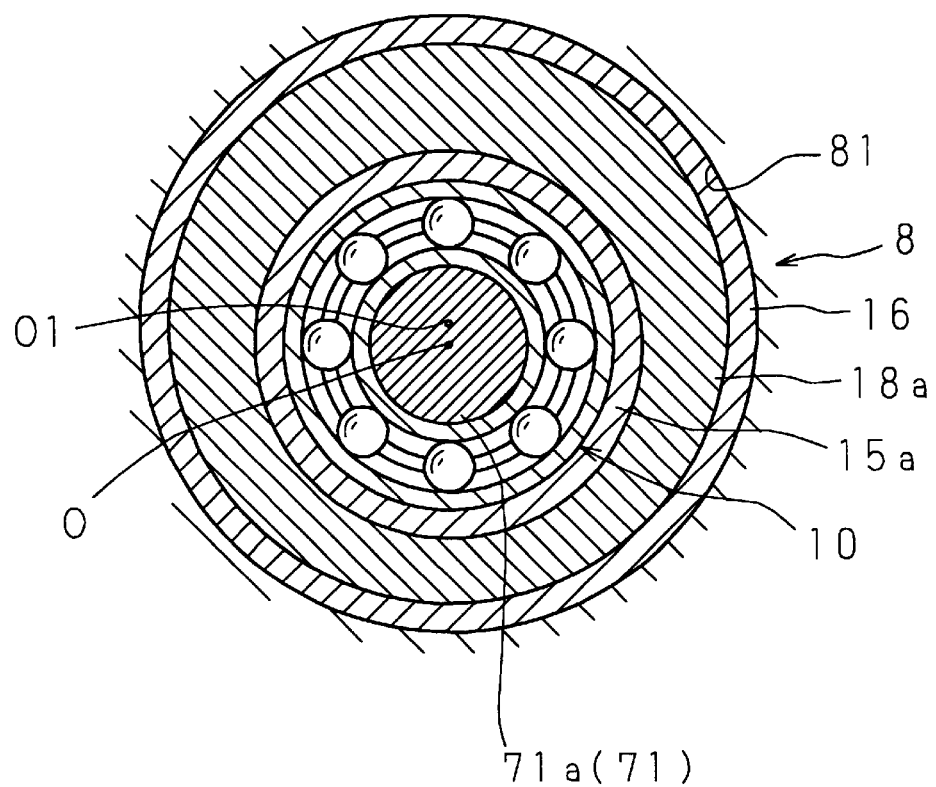
FIG. 12 is a magnified sectional view taken on line II—II of FIG. 10.

FIG. 11 is a vertical sectional view showing an elastic member, and FIG. 12 is a magnified sectional view taken on line II—II of FIG. 10.

As shown in FIG. 10, the elastic member 18a is integrated with the outer peripheral surface of a metallic inner side ring 15a pressure-fitted onto the outer ring of the first rolling bearing 10 and the inner peripheral surface of a metallic outer side ring 16 larger than the inner side ring 15a in diameter and pressure-fitted into the first fitting hole 81 by joining means, such as bonding by vulcanization. When the elastic member 18a is not deflected, it has the shape of a circular disc. The elastic member 18a may be made of synthetic resin instead of rubber.

As shown in FIG. 12, in a non-assembled state, the center O of the inner side ring 15a is eccentric with respect to the center O1 of the outer side ring 16 on the side wherein the worm 71 approaches the worm wheel 72. When the worm 71 is assembled by fitting the inner side ring 15a onto the first rolling bearing 10 and by fitting the outer side ring 16 into the first fitting hole 81 as shown in FIG. 10, the elastic restoring force of the elastic member 18a is applied to the worm 71 via the inner side ring 15a and the first rolling bearing 10, whereby a preliminary pressure is applied to the meshing portion.

In the electric power steering apparatus configured as described above, when the worm 71 is assembled, for example, when the outer periphery of the first rolling bearing 10 is pressure-fitted into the inner periphery of the inner side ring 15a while the inner side ring 15a, the outer side ring 16 and the elastic member 18a are integrated, the outer side ring 16 is pressure-fitted into the first fitting hole 81 of the housing 8 and secured thereto so that the center O of the inner side ring 15a positions on the meshing portion side as shown in FIGS. 10 and 12. After this, the worm 71 is inserted from the second fitting hole 82 to the third housing portion 8c, and the shaft portion 71a on the one side of the worm 71 is fitted into the inner ring of the first rolling bearing 10 and supported thereby. Furthermore, the second rolling bearing 11 is fitted into the second fitting hole 82 and fitted onto the shaft portion 71b at the other end portion of the worm 71, and the screw ring 9 is screwed into the screw hole 83.

Since the rotation operation force of the screw ring 9 is transmitted to the worm 71 via the outer ring, rolling members and inner ring of the second rolling bearing 11, thrust gap of the second rolling bearing 11 becomes zero, and the worm 71 is moved toward the first rolling bearing 10. In addition, since the rotation operation force of the screw ring 9 is transmitted from the worm 71 to the elastic member 18a via the inner ring, rolling members and outer ring of the first rolling bearing 10, thrust gap of the first rolling bearing 10 becomes zero, and the elastic member 18a is deflected in the direction of a thrust load as shown in FIG. 10. The elastic restoring force owing to the deflection of the elastic member 18a is applied to the worm 71 as the thrust load, thereby preventing the worm 71 from rattling in its axial direction.

Furthermore, as shown in FIG. 12, the center O of the inner side ring 15a is eccentric with respect to the center O1 of the outer side ring 16 on the side wherein the worm 71 approaches the worm wheel 72. Hence, the elastic member 18a is deflected in its radial direction owing to the meshing of the worm 71 and the worm wheel 72. The elastic restoring force owing to the deflection of the elastic member 18a is applied to the worm 71 via the inner side ring 15a and the first rolling bearing 10, whereby the gap at the meshing portion of the worm 71 and the worm wheel 72 in the radial direction is absorbed.

By absorbing the gap at the meshing portion of the worm 71 and the worm wheel 72 in the radial direction by using the elastic member 18a as described above, the amount of the backlash at the meshing portion of the worm 71 and the worm wheel 72 can be reduced. In addition, even if the meshing condition is changed with time owing to increased amounts of the wear of the teeth of the worm 71 and the worm wheel 72 or other reasons, the amount of the backlash can be reduced.

Furthermore, the elastic member 18a itself is not fitted or secured, but joined to the inner side ring 15a and the outer side ring 16. The inner side ring 15a is fitted onto the first rolling bearing 10 and the outer side ring 16 is fitted into the first fitting hole 81 of the housing 8. For this reason, the preliminary pressure by the elastic member 18a in its deflection direction can be set easily in an appropriate range. Moreover, when the outer periphery of the first rolling bearing 10 is fitted into the inner periphery of the inner side ring 15a while the inner side ring 15a, the outer side ring 16 and the elastic member 18a are integrated, the first rolling bearing 10 and elastic member 18a can be assembled inside the housing 8 by fitting the outer side ring 16 into the housing 8. For this reason, the assembly workability of the elastic member 18a is improved.

Embodiment 6

Figure 13:
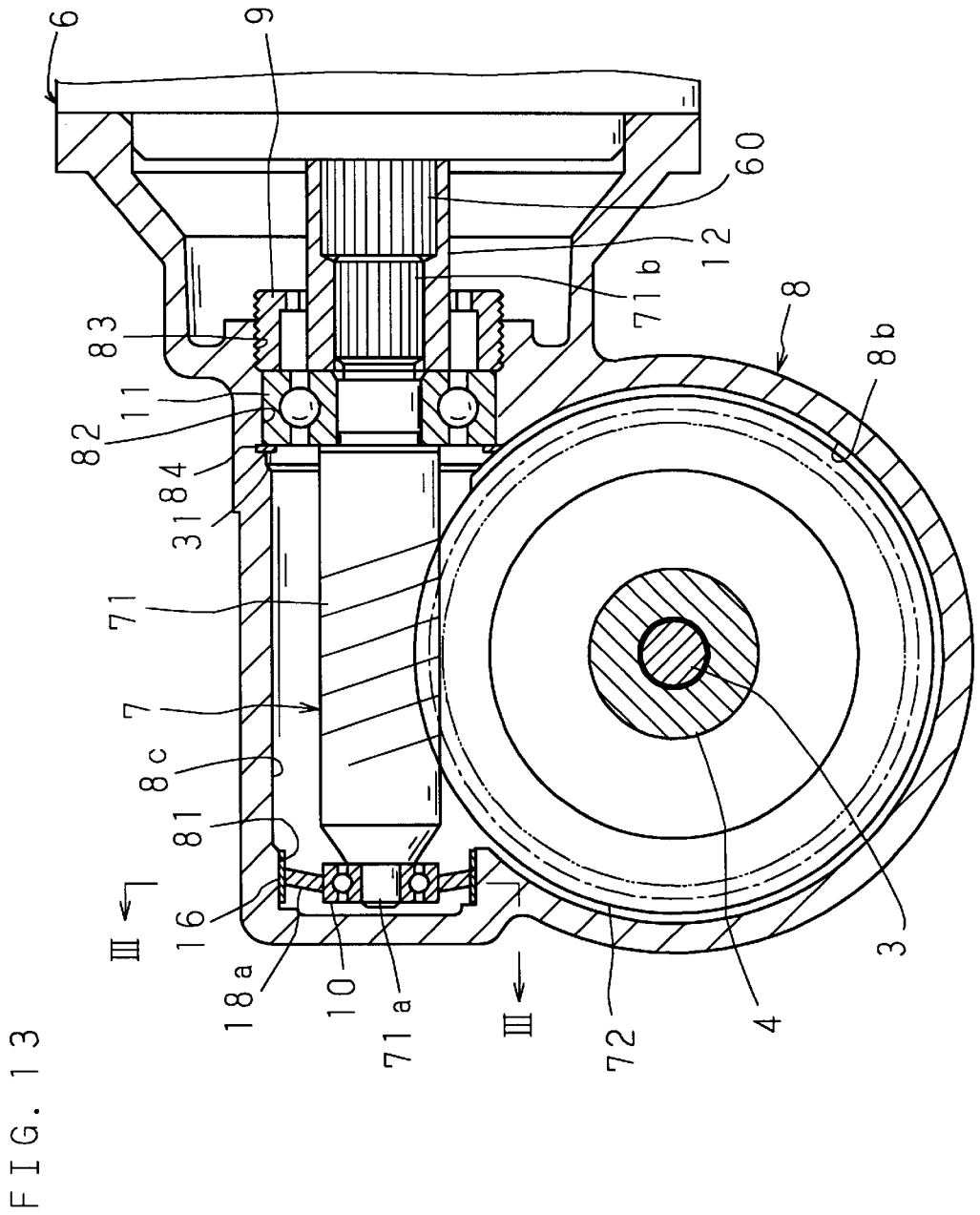
FIG. 13 is a magnified sectional view showing a worm support portion in accordance with Embodiment 6 of the electric power steering apparatus of the present invention.
Figure 14:
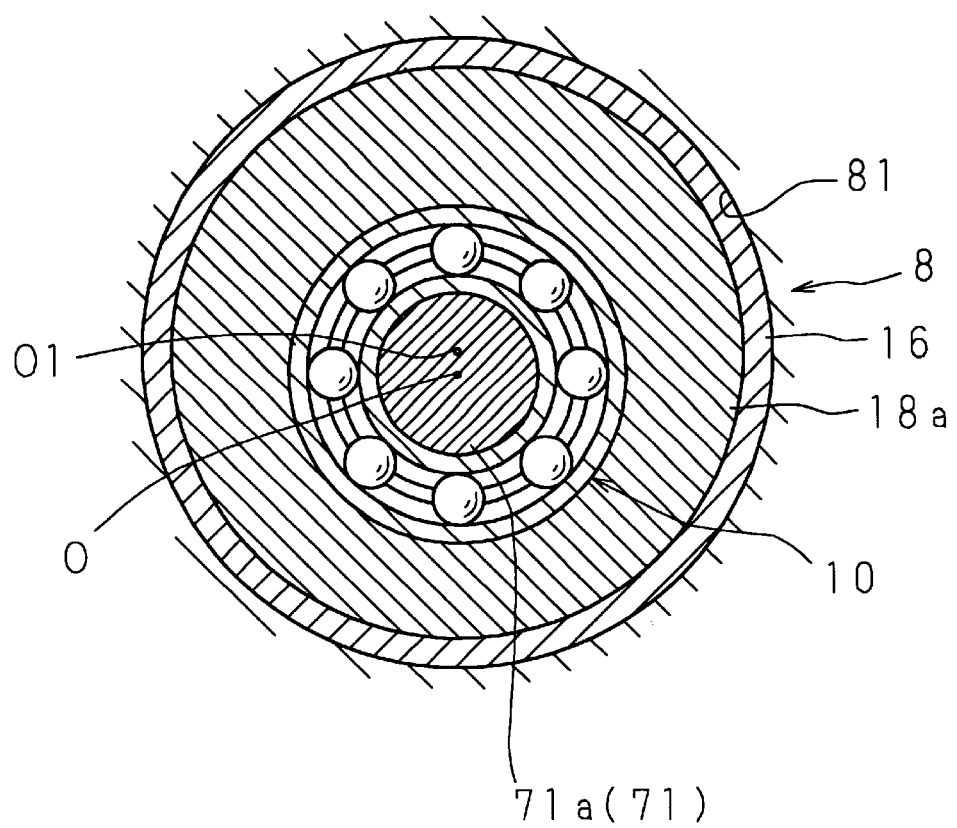
FIG. 14 is a magnified sectional view taken on line III—III of FIG. 13

FIG. 13 is a magnified sectional view showing a worm support portion in accordance with Embodiment 6. FIG. 14 is a magnified sectional view taken on line III—III of FIG. 13.

Unlike the case of Embodiment 5, in an electric power steering apparatus in accordance with Embodiment 6, the inner side ring 15a is not provided, and the elastic member 18a is directly joined to the outer peripheral surface of the first rolling bearing 10 by joining means, such as bonding by vulcanization. In a non-assembled state, the center O of the first rolling bearing 10 is eccentric with respect to the center O1 of the outer side ring 16 on the side wherein the worm 71 approaches the worm wheel 72. Furthermore, when the elastic member 18a is not deflected, it has the shape of a circular disc.

In Embodiment 6, when the worm 71 is assembled, since the first rolling bearing 10, the outer side ring 16 and the elastic member 18a formed into a circular disc are integrated, the worm 71 is assembled by fitting the outer side ring 16 into the first fitting hole 81 just as in the case of Embodiment 5.

In Embodiment 6, the elastic member 18a itself is not fitted or secured, but joined to the first rolling bearing 10 and the outer side ring 16. The outer side ring 16 is fitted into the first fitting hole 81 of the housing 8. For this reason, the preliminary pressure by the elastic member 18a in its deflection direction can be set easily in an appropriate range. Moreover, the first rolling bearing 10 and elastic member 18a can be assembled inside the housing 8 by fitting the outer side ring 16 into the housing 8. For this reason, the assembly workability of the elastic member 18a is improved.

Since the other configurations and operations are similar to those of Embodiment 5, similar components are designated by the same numerals, and the explanations of their details and operations are omitted.

In Embodiments 5 and 6, the elastic member 18a may be made of synthetic resin or may be formed of a plate spring made of metal, secured to the inner side ring 15a and the outer side ring 16, instead of rubber. In addition, the inner side ring 15a and the outer side ring 16 may be made of synthetic resin instead of metal. Furthermore, the elastic member 18a may have a shape having oval through holes at a plurality of peripheral positions, instead of the circular disc. Moreover, the elastic member 18a may have a shape provided with separate portions at a plurality of peripheral positions.

Furthermore, in Embodiments 5 and 6 described above, the elastic member 18a is used to prevent the worm 71 from rattling in its axial direction and to reduce the amount of the backlash at the meshing portion of the worm 71 and the worm wheel 72. Instead of this, the elastic member 18a may be used to reduce only the amount of the backlash at the meshing portion. In this case, sliding bearings may be used instead of the rolling bearings as bearings for supporting the worm 71.

Embodiment 7

Figure 15:
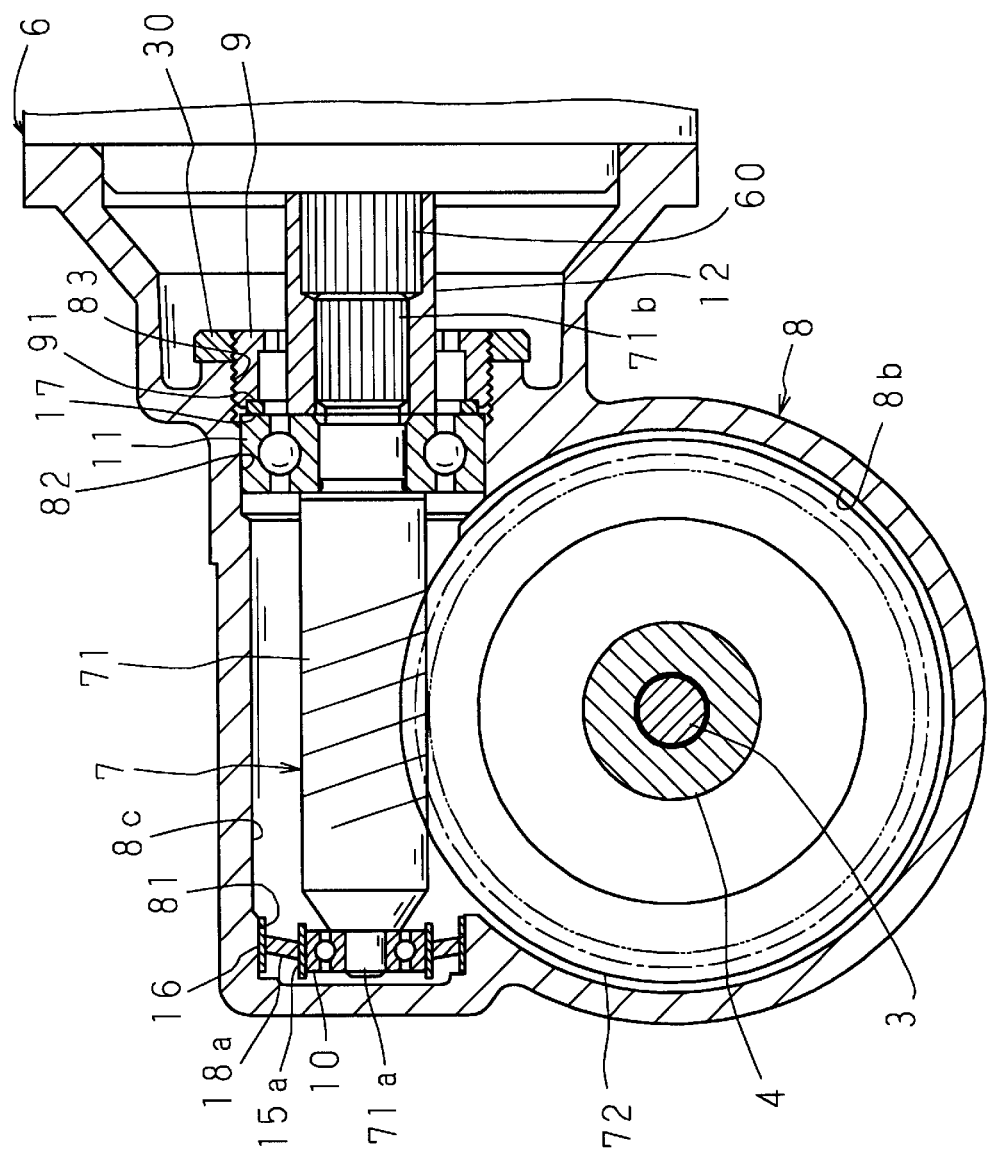
FIG. 15 is a magnified sectional view showing a worm support portion in accordance with Embodiment 7 of the electric power steering apparatus of the present invention.
Figure 16:
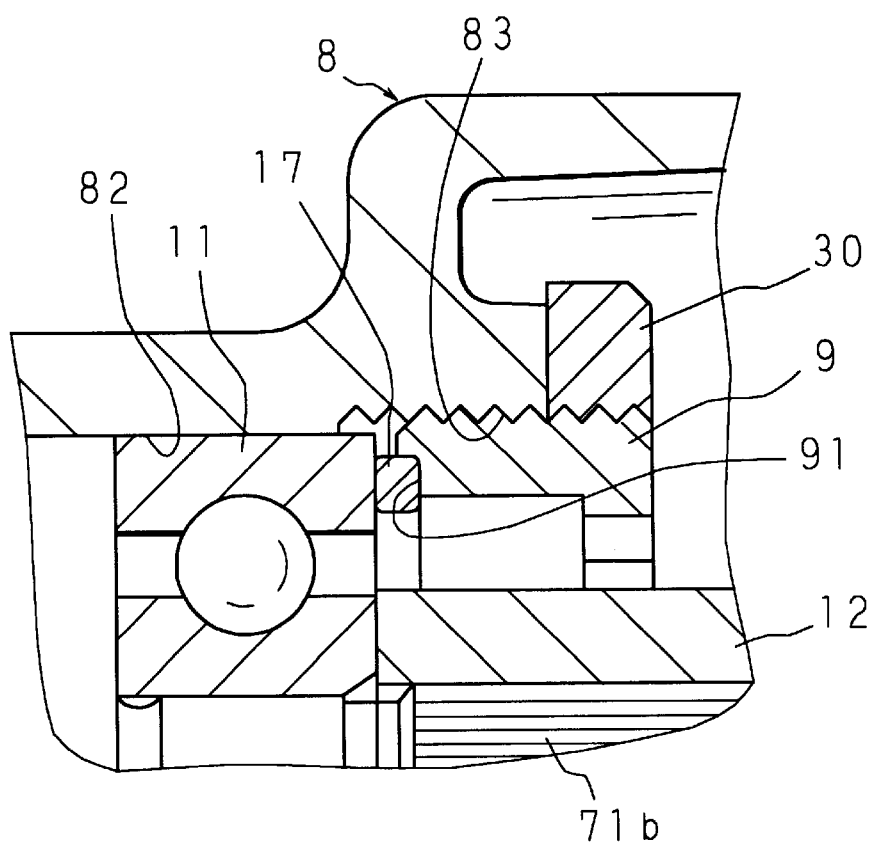
FIG. 16 is a magnified sectional view showing a screw ring portion in accordance with Embodiment 7 of the electric power steering apparatus of the present invention.

FIG. 15 is a magnified sectional view showing a worm support portion in accordance with Embodiment 7. FIG. 16 is a magnified sectional view showing a screw ring portion thereof.

In an electric power steering apparatus in accordance with Embodiment 7, the screw ring 9 screwed into the screw hole 83 of the housing 8 is not made direct contact with the second rolling bearing 11. An elastic ring 17 made of rubber, such as an O-ring, which deflects when the screw ring 9 is tightened, is disposed between the screw ring 9 and the second rolling bearing 11. With this configuration, the rotation operation force of the screw ring 9 is applied to the second rolling bearing 11 via the elastic ring 17.

The lock nut 30 is screwed onto the screw ring 9 to restrain the worm 71 from moving in its axial direction.

In Embodiment 7, a circular recess 91 is formed at one end portion of the screw ring 9, and the elastic ring 17 is fitted into the circular recess 91 and held therein. The depth of the circular recess 91 is smaller than the thickness of the elastic ring 17. The elastic ring 17 makes contact with the outer ring of the second rolling bearing 11 and is deflected when the screw ring 9 is tightened.

In Embodiment 7, since the rotation operation force of the screw ring 9 is transmitted to the worm 71 via the elastic ring 17, the outer ring, rolling members and inner ring of the second rolling bearing 11, thrust gap of the second rolling bearing 11 becomes zero, and the worm 71 is moved toward the first rolling bearing 10. In addition, since the rotation operation force of the screw ring 9 is transmitted from the worm 71 to the elastic member 18*a* via the inner ring, rolling members and outer ring of the first rolling bearing 10, thrust gap of the first rolling bearing 10 becomes zero, and the elastic member 18*a* and the elastic ring 17 are deflected in the direction of a thrust load. The elastic restoring force owing to the deflection of the elastic member 18*a* and the elastic ring 17 is applied to the worm 71 as the thrust load, thereby favorably preventing the worm 71 from rattling in its axial direction.

Since the other configurations and operations are similar to those of Embodiment 5, similar components are designated by the same numerals, and the explanations of their details and operations are omitted.

Furthermore, in Embodiments 5 to 7 described above, the center of the inner side ring 15*a* or the center of the first rolling bearing 10 is made eccentric with respect to the center of the outer side ring 16. However, instead of this, the inner side ring 15*a* may be concentric with the outer side ring 16, or the first rolling bearing 10 may be concentric with the outer side ring 16, and the center of the first fitting hole 81 may be made eccentric with respect to the center of the second fitting hole 82. In addition, the worm wheel 72 may be formed to have a large diameter appropriate to the amount of the eccentricity of the above-mentioned eccentric configuration, thereby to raise the worm 71 in its radial direction from the meshing portion of the worm 71 and the worm wheel 72 and to deflect the elastic member 18*a* in order to apply a preliminary pressure to the worm 71.

Embodiment 8

Figure 17:
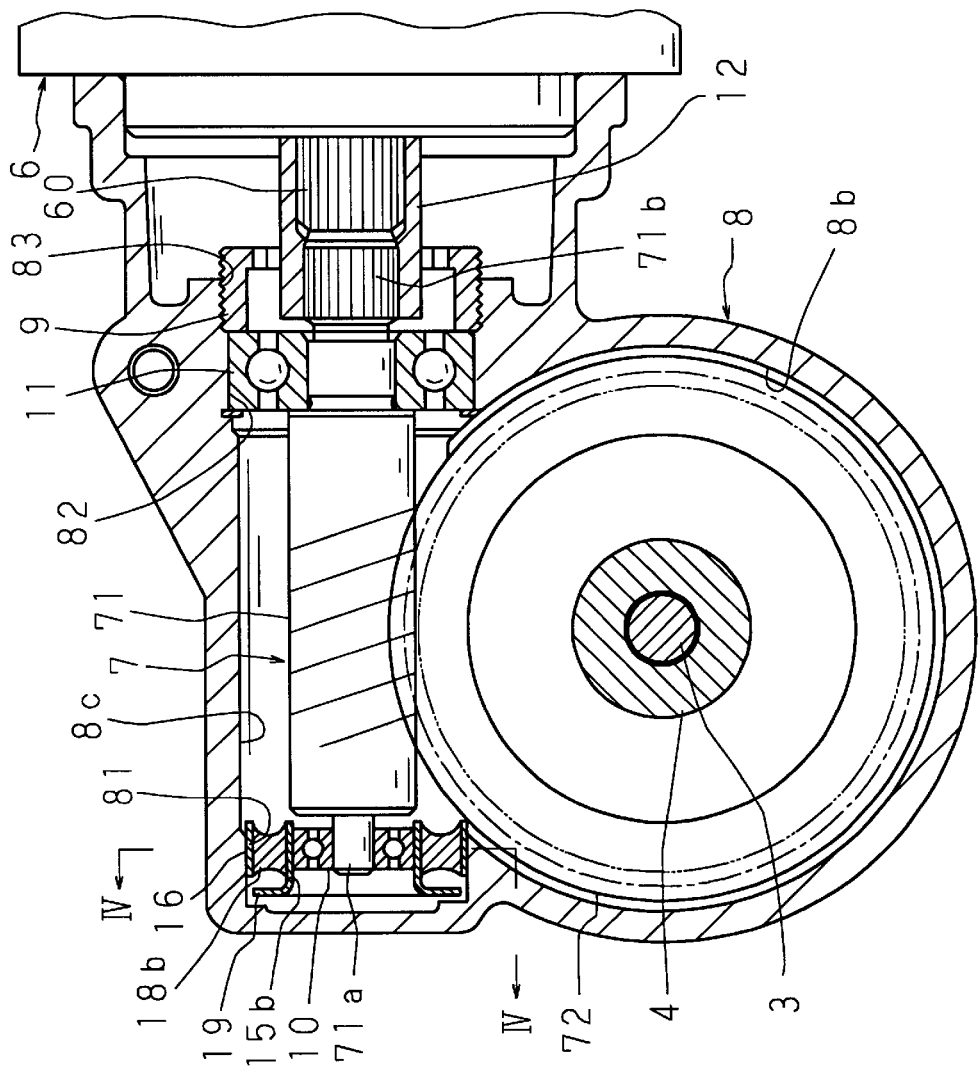
FIG. 17 is a magnified sectional view showing a reduction mechanism portion in accordance with Embodiment 8 of the electric power steering apparatus of the present invention.
Figure 18:
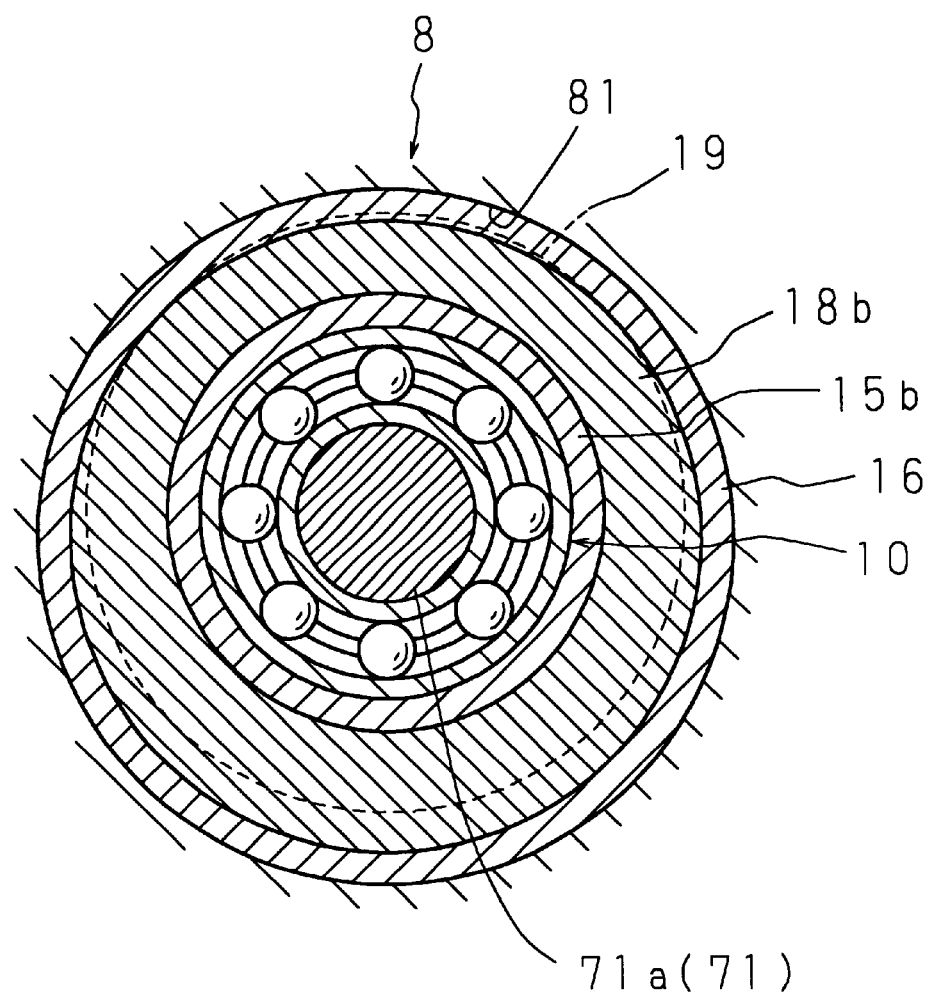
FIG. 18 is a magnified sectional view taken on line IV—IV of FIG. 17.

FIG. 17 is a magnified sectional view showing a reduction mechanism portion in accordance with Embodiment 8. FIG. 18 is a magnified sectional view taken on line IV—IV of FIG. 17.

The worm 71 is disposed so as to intersect the axis of the second steering shaft 4. The inner ring of the first rolling bearing 10 is fitted onto the shaft portion 71*a* at one end portion of the worm 71. The shaft portion 71*a* at the one end portion of the worm 71 is rotatably supported in the first fitting hole 81 via a rubber elastic member 18*b* which is provided on the outer periphery of the outer ring of the first rolling bearing 10 and makes the worm 71 eccentric with respect to the worm wheel 72. The shaft portion 71*b* at the other end portion of the worm 71 is rotatably supported in the second fitting hole 82 via the second rolling bearing 11. Furthermore, by tightening the screw ring 9 screwed into the screw hole 83, the worm 71 is restrained from moving in its axial direction. Moreover, the shaft portion 71*b* at the other end portion of the worm 71 is spline-fitted into the inner surface of the joint tube 12 and connected to the output shaft 60.

The reduction mechanism portion is designed, set and manufactured so that the distance between the centers of the first fitting hole 81 and the second housing portion 8*b* of the housing 8 is smaller than the distance between the rotation centers of the worm 71 the worm wheel 72 and so that a minus gap is generated in the radial direction at the meshing portion of the worm 71 and the worm wheel 72.

The elastic member 18*b* is integrated with the outer peripheral surface of a metallic inner side ring 15*b* fitted onto the outer ring of the first rolling bearing 10 and the inner peripheral surface of the metallic outer side ring 16 larger than the inner side ring 15*b* in diameter and fitted into the first fitting hole 81 by joining means, such as bonding by vulcanization. The elastic member 18*b* may be made of synthetic resin instead of rubber.

Before fitted into the first fitting hole 81, the inner side ring 15*b* is concentric with the outer side ring 16. However, when the inner side ring 15*b* is fitted onto the first rolling bearing 10 and the outer side ring 16 is fitted into the first fitting hole 81, the inner side ring 15*b* is made eccentric with respect to the center of the outer side ring 16 to a side wherein the worm 71 separates from the worm wheel 72 in the radial direction. Hence, the elastic restoring force of the elastic member 18*b* is applied to the worm 71 via the first rolling bearing 10, and a preliminary pressure is applied to the meshing portion, whereby an allowable amount of eccentricity owing to the above-mentioned difference in dimension can be absorbed.

The inner side ring 15*b* is integrally provided with a disc-shaped stopper 19 extended from one end portion thereof in the radial direction and disposed to face the first fitting hole 81 with an appropriate distance therebetween. When the elastic member 18*b* is deflected by the meshing reaction force applied to the meshing portion, the stopper 19 makes contact with the first fitting hole 81, thereby limiting the amount of the deflection of the elastic member 18*b*. The stopper 19 is formed of a metal plate so as to be almost concentric with the inner side ring 15*b*.

To obtain the above-mentioned difference in dimension, the center of the first fitting hole 81 may be made eccentric with respect to the second fitting hole 82 toward the worm wheel 72.

In the electric power steering apparatus configured as described above, when the worm 71 is assembled, for example, the inner side ring 15*b* fitted onto the first rolling bearing 10 and secured thereto, the elastic member 18*b* and the outer side ring 16 are inserted into the third housing portion 8*c* together with the first rolling bearing 10, and the outer side ring 16 is fitted into the first fitting hole 81 and secured thereto. After this, the worm 71 is inserted from the second fitting hole 82 to the third housing portion 8*c*, and the shaft portion 71*a* on the one side of the worm 71 is fitted into the inner ring of the first rolling bearing 10 and supported thereby. Furthermore, the second rolling bearing 11 is fitted into the second fitting hole 82 and fitted onto the shaft portion 71*b* at the other end portion of the worm 71, and the screw ring 9 is screwed into the screw hole 83. As a result, the worm 71 is restrained from moving in its axial direction, and the elastic restoring force of the elastic member 18*b* is applied to the worm 71 via the first rolling bearing 10, whereby the gap at the meshing portion of the worm 71 and the worm wheel 72 in the radial direction can be absorbed.

By absorbing the gap at the meshing portion of the worm 71 and the worm wheel 72 in the radial direction by using the elastic member 18*b* as described above, the amount of the backlash at the meshing portion of the worm 71 and the worm wheel 72 can be reduced. In addition, even if the meshing condition is changed with time owing to increased amounts of the wear of the teeth of the worm 71 and the worm wheel 72 or other reasons, the amount of the backlash can be reduced.

In addition, when the worm 71 is pressed so as to separate from the worm wheel 72 in the radial direction by a meshing reaction force applied to the meshing portion of the worm 71 and the worm wheel 72, the elastic member 18*b* is deflected and the stopper 19 makes contact with the first fitting hole 81, whereby the amount of the deflection of the elastic member 18*b* can be limited. Hence, the worm 71 can be prevented from moving beyond its allowable amount of eccentricity, and the meshing condition of the worm 71 and the worm wheel 72 can be made proper. Furthermore, the elastic restoring force of the elastic member 18*b* can be made smaller to a necessary minimum limit, and the rotation torque applied to the meshing portion can be made relatively small.

In Embodiment 8 described above, the disc-shaped stopper 19 extended in the radial direction is provided at one end portion of the inner side ring 15*b*. When the stopper 19 makes contact with the first fitting hole 81, the amount of the deflection of the elastic member 18*b* is limited. However, instead of this configuration, a contact portion capable of making contact with the stopper 19 may be provided on one end portion of the outer side ring 16 so that the amount of the deflection of the elastic member 18*b* is limited when the stopper 19 makes contact with the contact portion of the outer side ring 16. In addition, the stopper 19 may be provided on one end portion of the outer side ring 16, and a contact portion capable of making contact with the stopper 19 may be provided on one end portion of the inner side ring 15*b* so that the amount of the deflection of the elastic member 18*b* is limited when the stopper 19 makes contact with the contact portion of the inner side ring 15*b*. Furthermore, the stopper 19 may be provided at both end portions of the inner side ring 15*b* or at both end portions of the outer side ring 16.

In Embodiment 8 described above, the stopper 19 is formed to have the shape of a disc. However, instead of this configuration, the stopper 19 may be provided only on a side wherein the worm 71 is separated from the worm wheel 72 in the radial direction by the meshing reaction force applied to the meshing portion, and the shape of the stopper 19 is not limited to be any special shape. In addition, instead of being integrated with the inner side ring 15*b* or the outer side ring 16, the stopper 19 may be provided as an independent component and secured to the inner side ring 15*b* or the outer side ring 16.

Furthermore, in Embodiment 8 described above, the shaft portion 71*a* at one end portion of the worm 71 is supported by using the first rolling bearing 10, and the elastic member 18*b* is provided on the outer periphery of the first rolling bearing 10. However, instead of the first rolling bearing 10, a sliding bearing may be used, and the elastic member 18*b* may be provided on the outer periphery of the sliding bearing.

Embodiment 9

Figure 19:
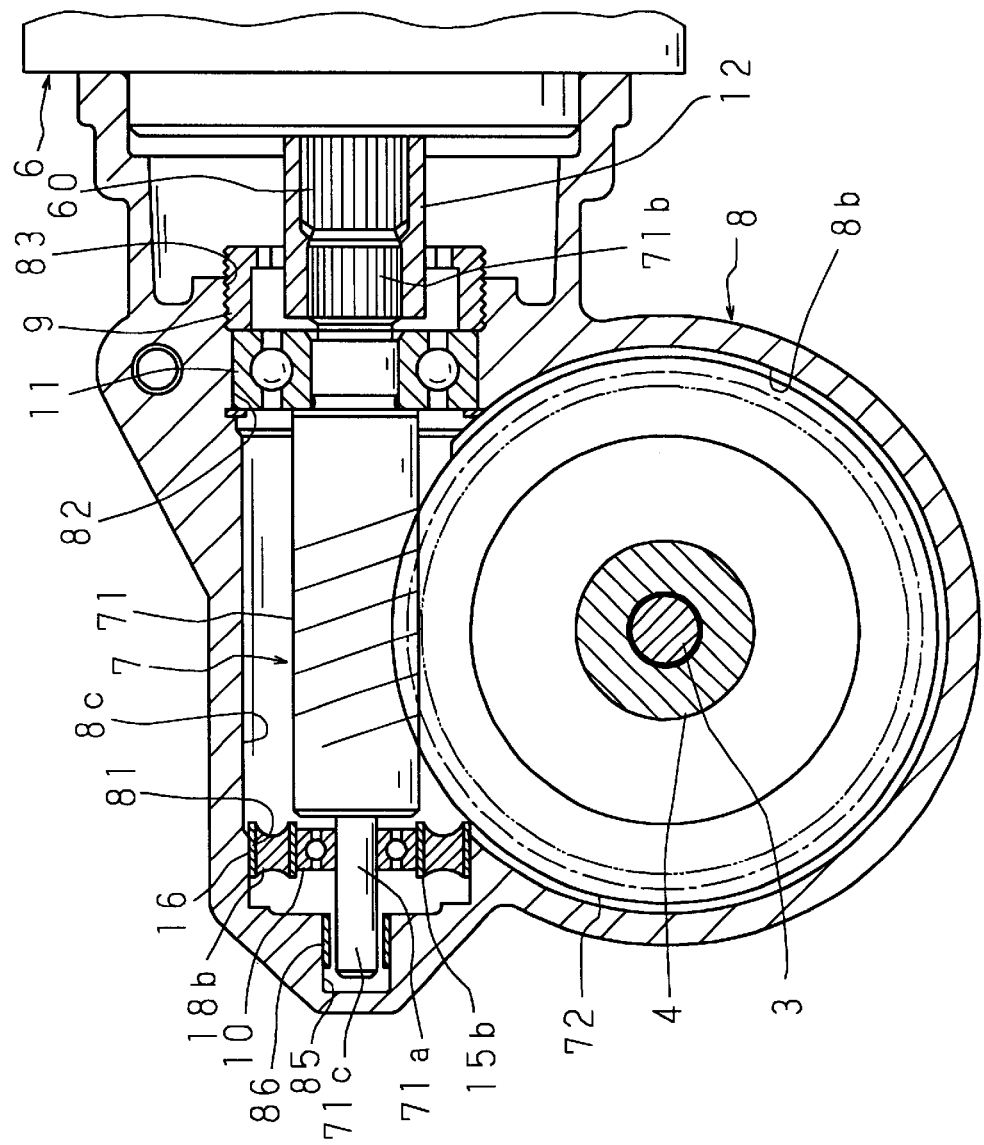
FIG. 19 is a magnified sectional view showing a reduction mechanism portion in accordance with Embodiment 9 of the electric power steering apparatus of the present invention.

FIG. 19 is a magnified sectional view showing a reduction mechanism portion in accordance with Embodiment 9.

In an electric power steering apparatus in accordance with Embodiment 9, instead of the stopper 19 for limiting the amount of the deflection of the elastic member 18*b*, which is provided on the inner side ring 15*b* or the outer side ring 16, the shaft portion 71*a* at one end portion of the worm 71, that is, an extended shaft portion 71*c* extended outward in the axial direction from the support portion supported by the first rolling bearing 10 inside the third housing portion 8*c*, is provided. Inside the third housing portion 8*c* of the housing 8, a recess hole 85 into which the extended shaft portion 71*c* is inserted is provided so as to be concentric with the fitting hole 81. A circular ring 86 having an inside diameter smaller than that of the recess hole 85 is installed on the inner peripheral surface (inside) of the recess hole 85 so that the ring 86 is used as the stopper.

In Embodiment 9, the ring 86 is made of a material having relatively small frictional resistance, such as synthetic resin or alloy, and pressure-fitted into the recess hole 85. The gap between the inner peripheral surface of the ring 86 and the extended shaft portion 71*c* is approximately 0.1 mm, for example.

In addition, the inner side ring 15*b*, the elastic member 18*b* and the outer side ring 16 are provided on the outer periphery of the first rolling bearing 10 to support the worm 71 inside the third housing portion 8*c*. In Embodiment 9, however, the stopper 19 is not provided.

In Embodiment 9, by absorbing the gap at the meshing portion of the worm 71 and the worm wheel 72 in the radial direction by using the elastic member 18*b* provided on the outer periphery of the first rolling bearing 10, the amount of the backlash at the meshing portion of the worm 71 and the worm wheel 72 can be reduced. In addition, even if the meshing condition is changed with time owing to increased amounts of the wear of the teeth of the worm 71 and the worm wheel 72 or other reasons, the amount of the backlash can be reduced.

In addition, when the worm 71 is pressed so as to separate from the worm wheel 72 in the radial direction by a meshing reaction force applied to the meshing portion of the worm 71 and the worm wheel 72, the elastic member 18*b* is deflected and the extended shaft portion 71*c* makes contact with the recess hole 85, whereby the amount of the deflection of the elastic member 18*b* can be limited. Hence, the worm 71 can be prevented from moving beyond its allowable amount of eccentricity, and the meshing condition of the worm 71 and the worm wheel 72 can be made proper. Furthermore, the elastic restoring force of the elastic member 18*b* can be made smaller to a necessary minimum limit, and the rotation torque applied to the meshing portion can be made very small.

In addition, the ring 86 used as a stopper is provided independently of the inner side ring 15*b* and the outer side ring 16 joined to the elastic member 18*b*. For this reason, when the elastic member 18*b* is bonded by vulcanization to the outer peripheral surface of the inner side ring 15*b* and to the inner peripheral surface of the outer side ring 16, bonding work by vulcanization can be carried out easily on both end portions of the inner side ring 15*b* and the outer side ring 16. Workability can thus be improved.

The ring 86 is formed of a material having relatively small frictional resistance. Hence, when the extended shaft portion 71*c* makes contact with the ring 86 used as a stopper, the rotation performance of the worm 71 can be made proper.

Since the other configurations and operations are similar to those of Embodiment 8, similar components are designated by the same numerals, and the explanations of their details and operations are omitted.

Furthermore, in Embodiment 9 described above, the recess hole 85 is provided in the housing 8, and the ring 86 used as a stopper for limiting the amount of the deflection of the elastic member 18*b* is fitted into the recess hole 85. Instead of this configuration, the stopper of Embodiment 9 may be provided so that a convex portion corresponding to the ring 86 projects on the inner peripheral surface of the recess hole 85 so as to be integrated therewith. Furthermore, instead of using the ring, the recess hole 85 itself may have the inside diameter of the ring 86. Moreover, a ring may be fitted onto the extended shaft portion 71*c*. As described above, the stopper is not limited to have any special structure.

Furthermore, the reduction mechanism 7 in accordance with Embodiments 1 to 9 described above comprises the worm 71 used as a small-diameter driving gear and the worm wheel 72 used as a large-diameter driven gear. Instead of this configuration, the reduction mechanism 7 may comprise a hypoid pinion used as a small-diameter driving gear and a hypoid wheel used as a large-diameter driven gear. Furthermore, the reduction mechanism 7 may comprise bevel gears.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus comprising a driving gear rotatably supported by a bearing inside a housing and rotating interlocked with the rotation of a steering assist motor, and a driven gear meshing with said driving gear and connected to a steering mechanism so that steering is assisted by the rotation of said motor, comprising:
    an inner side ring fitted onto said bearing;
    an outer side ring fitted into said housing; and
    an elastic member joined to both said inner side ring and said outer side ring and constructed to support said bearing so as to make said driving gear eccentric to said driven gear.

2. The electric power steering apparatus as set forth in claim 1, wherein
    said bearing is a rolling bearing, and
    the axial position of said driving gear is set at a position wherein a thrust load is applied from said driving gear to said elastic member via said rolling bearing and said elastic member is deflected by the thrust load.

3. An electric power steering apparatus comprising a driving gear rotatably supported by a bearing inside a housing and rotating interlocked with the rotation of a steering assist motor, and a driven gear meshing with said driving gear and connected to a steering mechanism so that steering is assisted by the rotation of said motor, comprising:
    an inner side ring fitted onto said bearing;
    an outer side ring fitted into said housing; and
    an elastic member joined to both said inner side ring and said outer side ring to make said driving gear eccentric to said driven gear
    said bearing is a rolling bearing, and
    the axial position of said driving gear is set at a position wherein a thrust load is applied from said driving gear to said elastic member via said rolling bearing and said elastic member is deflected by the thrust load
    wherein said elastic member is a circular disc.

4. The electric power steering apparatus as set forth in claim 3, further comprising a positioning member for adjusting the axial position of said driving gear.

5. The electric power steering apparatus as set forth in claim 4, wherein said positioning member is a screw ring screwed into said housing,
    said bearing comprises one pair each fitted onto one of both end portions of said driving gear, respectively,
    one of said bearings is held inside said housing via said elastic member and the other bearing is disposed at a position facing said screw ring, and
    an elastic ring is provided between said other bearing and said screw ring.

6. An electric power steering apparatus comprising a driving gear rotatably supported by a bearing inside a housing and rotating interlocked with the rotation of a steering assist motor, and a driven gear meshing with said driving gear and connected to a steering mechanism so that steering is assisted by the rotation of said motor, comprising:
    a ring fitted into said housing; and
    an elastic member joined to said ring and said bearing and constructed to support said bearing so as to make said driving gear eccentric to said driven gear.

7. The electric power steering apparatus as set forth in claim 6, wherein
    said bearing is a rolling bearing, and
    the axial position of said driving gear is set at a position wherein a thrust load is applied from said driving gear to said elastic member via said rolling bearing and said elastic member is deflected by the thrust load.

8. The electric power steering apparatus as set forth in claim 7, wherein said elastic member is a circular disc.

9. The electric power steering apparatus as set forth in claim 8, further comprising a positioning member for adjusting the axial position of said driving gear.

10. The electric power steering apparatus as set forth in claim 9, wherein said positioning member is a screw ring screwed into said housing,
    said bearing comprises one pair each fitted onto one of both end portions of said driving gear, respectively,
    one of said bearings is held inside said housing via said elastic member and the other bearing is disposed at a position facing said screw ring, and
    an elastic ring is provided between said other bearing and said screw ring.

11. An electric power steering apparatus comprising a driving gear rotatably supported by a bearing inside a housing and rotating interlocked with the rotation of a steering assist motor, and a driven gear meshing with said driving gear and connected to a steering mechanism so that steering is assisted by the rotation of said motor, comprising:
    an inner side ring fitted onto the outer periphery of said bearing;
    an outer side ring fitted into said housing; and
    an elastic member joined to both of said inner side ring and said outer side ring and constructed to support said bearing so as to make said driving gear eccentric to said driven gear, wherein
        a stopper is provided on one of said inner side ring or said outer side ring to limit the amount of the deflection of said elastic member by making contact with another of said inner side ring or said outer side ring, or said housing.

12. The electric power steering apparatus as set forth in claim 11, wherein said stopper has the shape of a disc extended in the radial direction.

13. An electric power steering apparatus comprising a driving gear rotatably supported by a bearing inside a housing and rotating interlocked with the rotation of a steering assist motor, and a driven gear meshing with said driving gear and connected to a steering mechanism so that steering is assisted by the rotation of said motor, comprising:
    an inner side ring fitted onto the outer periphery of said bearing;
    an outer side ring fitted into said housing; and
    an elastic member joined to both of said inner side ring and said outer side ring and constructed to support said bearing so as to make said driving gear eccentric to said driven gear, wherein
        said driving gear has an extended shaft portion extended outward from the support portion supported by said bearing inside said housing, and a stopper is provided on at least one of said extended shaft portion or said housing to limit the amount of the deflection of said elastic member by making contact with another of said extended shaft portion or said housing.

14. The electric power steering apparatus as set forth in claim 13, wherein said housing has a recess hole into which said extended shaft portion is inserted, and said stopper is a ring attached to at least one of said extended shaft portion or in said recess hole.

15. An electric power steering apparatus comprising a driving gear rotatably supported by a bearing inside a housing and rotating interlocked with the rotation of a steering assist motor, and a driven gear meshing with said driving gear and connected to a steering mechanism so that steering is assisted by the rotation of said motor, comprising:

an elastic member constructed to support said bearing so as to make said driving gear eccentric to said driven gear; and means for fixing said elastic member to the inside of the housing and the bearing;

whereby the elastic member provides a force directed between the driving gear the driven gear, as well as an axial force along the driving gear.

16. The apparatus of claim 15 wherein the elastic member is generally disc shaped, includes a generally cylindrical periphery, and has a generally cylindrical space therein which is eccentric relative to the periphery.

* * * * *

UNITED STATES PATENT AND TRADEMARK OFFICE
CERTIFICATE OF CORRECTION

PATENT NO.    : 6,769,507 B2
DATED         : August 3, 2004
INVENTOR(S)   : Tetsuya Murakami et al.

It is certified that error appears in the above-identified patent and that said Letters Patent is hereby corrected as shown below:

Title page,
Insert Item -- [63], Foreign Application Priority Data,
    May 17, 2000 (JP) ......................2000-145613 --.

Signed and Sealed this

Eighteenth Day of January, 2005

JON W. DUDAS
*Director of the United States Patent and Trademark Office*